(12) United States Patent
Meempat et al.

(10) Patent No.: US 7,292,594 B2
(45) Date of Patent: Nov. 6, 2007

(54) WEIGHTED FAIR SHARE SCHEDULER FOR LARGE INPUT-BUFFERED HIGH-SPEED CROSS-POINT PACKET/CELL SWITCHES

(75) Inventors: Gopalakrishnan Meempat, East Brunswick, NJ (US); Gopalakrishnan Ramamurthy, West Windsor, NJ (US); William J. Dally, Stanford, CA (US)

(73) Assignee: LSI Corporation, Milpitas, CA (US)

( * ) Notice: Subject to any disclaimer, the term of this patent is extended or adjusted under 35 U.S.C. 154(b) by 1079 days.

(21) Appl. No.: 10/339,796

(22) Filed: Jan. 9, 2003

(65) Prior Publication Data

US 2003/0227932 A1 Dec. 11, 2003

Related U.S. Application Data

(60) Provisional application No. 60/387,394, filed on Jun. 10, 2002.

(51) Int. Cl.
*H04L 12/56* (2006.01)

(52) U.S. Cl. .................. 370/413; 370/416; 370/418

(58) Field of Classification Search ............. 370/412
See application file for complete search history.

(56) References Cited

U.S. PATENT DOCUMENTS 6,246,687 B1 6/2001 Siu

| | | | |
|---|---|---|---|
| 6,351,466 B1* | 2/2002 | Prabhakar et al. | 370/413 |
| 6,359,861 B1* | 3/2002 | Sui et al. | 370/230 |
| 6,563,837 B2* | 5/2003 | Krishna et al. | 370/413 |
| 6,963,576 B1* | 11/2005 | Lee | 370/411 |
| 6,990,072 B2* | 1/2006 | Alasti et al. | 370/230 |
| 7,006,514 B2* | 2/2006 | Oki et al. | 370/415 |
| 7,023,840 B2* | 4/2006 | Golla et al. | 370/360 |
| 7,023,841 B2* | 4/2006 | Dell et al. | 370/388 |
| 7,065,046 B2* | 6/2006 | Andrews et al. | 370/230 |
| 7,142,555 B2* | 11/2006 | Wang | 370/429 |
| 7,161,906 B2* | 1/2007 | Dell et al. | 370/231 |
| 2002/0141427 A1* | 10/2002 | McAlpine | 370/413 |
| 2003/0165151 A1* | 9/2003 | Chao et al. | 370/416 |
| 2003/0227932 A1* | 12/2003 | Meempat et al. | 370/415 |
| 2004/0163084 A1* | 8/2004 | Devadas et al. | 718/103 |

* cited by examiner

*Primary Examiner*—Wellington Chin
*Assistant Examiner*—Soon D. Hyun
(74) *Attorney, Agent, or Firm*—Christopher P Maiorana PC

(57) ABSTRACT

A switching fabric connects input ports to output ports. Each input has an input pointer referencing an output port, and each output has an output pointer referencing an input port. An arbiter includes input and output credit allocators, and an arbitration module (matcher). The input credit allocator resets input credits associated with input/output pairs and updates the input pointers. Similarly, the output credit allocator resets output credits associated with input/output pairs and updates the output pointers. The matcher matches inputs to outputs based on pending requests and available input and output credits. A scheduler schedules transmissions through the cross-bar switch according to the arbiter's matches.

71 Claims, 11 Drawing Sheets

WEIGHTED FAIR SHARE SCHEDULER FOR LARGE INPUT-BUFFERED HIGH-SPEED CROSS-POINT PACKET/CELL SWITCHES

RELATED APPLICATION(S)

This application claims the benefit of U.S. Provisional Application No. 60/387,394, filed Jun. 10, 2002. The entire teachings of the above application are incorporated herein by reference.

FIELD OF INVENTION

The present invention applies to the field of scalable large-scale packet communication switches, which provide quality of service (QoS) guarantees at Terabits per second speeds.

BACKGROUND OF THE INVENTION

With respect to the design of large-scale packet switches and routers, it is well known that a pure output buffering strategy, while providing high switching efficiency, is not scalable as switch dimensions get larger. This is due to the requirement that the switch core operate faster than the individual switch ports by a factor equivalent to the number of ports. For this reason, large capacity switches are generally of the "input buffered" variety, with the input and output port modules being interconnected via a crossbar switch fabric.

On the other hand, experience shows that input queuing in conjunction with a first-in-first-out (FIFO) buffering arrangement can severely limit the switch throughput, owing to the so called "head-of-line" (HoL) blocking problem. To overcome this problem, the buffer at each input port is organized into a set of "virtual output queues" (VOQs). Each VOQ is dedicated for packets destined to a particular output port.

FIG. 1 is a schematic diagram illustrating a VOQ switch 100 with N input ports 101 and N output ports 103. It is assumed that time axis is divided into "slots" of equal length. A central switch scheduler 105, in conjunction with the VOQ arrangement, is activated once during each slot. Assuming that packets of fixed length, or "cells", are equivalent to slots, the central scheduler 105 identifies, during each slot, a set of matching input/output pairs between which cells are transmitted via a crossbar switch 107 without conflict.

With a cell-based arrangement, transmission of variable-length packets necessitates fragmentation of the packets into fixed-size cells prior to switching, with reassembly occurring after switching. This is a limitation of most switching methods currently available.

The central scheduler 105 resolves contention for input and output port access among competing traffic streams (i.e., the $N^2$ VOQs) during each slot. In accordance with the input/output matches made by the central scheduler 105 during each slot, the local scheduler 109 at each input port 101 routes the head-of-line (HoL) packet from the particular VOQ 111 selected.

To implement this functionality, the central scheduler 105 receives reservation "requests" during every slot from all of the switch input ports for accesses to the various switch output ports, and arbitrates these requests to issue a conflict-free set of "grants" to the successful input ports. The requests and grants may propagate on a distinct in-band or out-of-band signaling channel 113. The input/output matches identified for each slot are recorded in a connection matrix, and forwarded (at 115) to the crossbar fabric 107, which is configured accordingly.

The throughput efficiency of the switch 107 is dependent on the efficacy of the scheduling algorithm. An optimal way to perform the scheduling function may be based on a "maximum weight matching" (MWM) approach. However, this is known to have a complexity of $O(N^{5/2})$, and is not practical to implement at the switching speeds of interest. For this reason, a variety of scheduling algorithms based on various forms of sub-optimal heuristics is currently used in the industry.

Three widely known heuristic algorithms for scheduling traffic in cell-based input-queued switches are "parallel iterative matching" (PIM), "round-robin matching" (RRM) and iSLIP. Each of these algorithms attempts to pick a conflict-free set of input/output matches during each cell slot, with the goal of attaining efficiency (i.e., maximizing the number of matches per cell slot), and fairness (i.e., providing equal bandwidth shares of each input and output port to competing backlogged traffic streams).

PIM achieves these goals by randomly selecting a candidate input for each output port in a first "output arbitration" phase, and then resolving conflicts among the plurality of outputs that may be picked for each input, in a second "input arbitration" phase which also employs a similar randomization strategy.

RRM achieves the same goals in a similar sequence of output and input arbitration phases, except that the selections are made in a deterministic fashion using a round-robin arbitration pointer implemented at each output and input. With their single iteration versions (i.e., the sequence of output arbitration followed by input arbitration being performed only once), the switch throughput under both PIM and RRM subject to full traffic backlog is known to saturate to a little over 60%.

iSLIP operates in a way similar to RRM, except that the movement of the output and input round-robin pointers is conditioned on successful matches, whereas it is unconditional in the case of RRM. With the latter modification, iSLIP is able to achieve 100% saturation throughput with a single iteration in fully backlogged systems.

With multiple iterations (i.e., the arbitration sequence being repeated p times to increase the number of matches), however, all the three schemes attain very nearly 100% throughput under full backlog, and the distinctions among them in terms of other performance attributes such as delay also become relatively indiscernible.

SUMMARY OF THE INVENTION

Two key limitations of traditional scheduling algorithms such as those discussed in the Background are (a) that they can only provide equal bandwidth shares to competing streams (assuming full backlog), but are incapable of supporting user-programmable bandwidth shares; and (b) that they are limited in scope to fixed-size cell based switching systems, i.e., variable-length packets cannot be supported without resorting to fragmentation/reassembly.

An embodiment of the present invention presents a new quality-of-service (QoS)-based scheduling algorithm that has (a) the ability to guarantee user-specified bandwidth requirements based on a weighted-fair-share scheduling (WFSS) function, and (b) the ability to switch both fixed-size packets (cells) and variable-size packets in a transparent manner, without resorting to packet fragmentation/reassembly.

A parallelized algorithm is utilized in which 2N modules (one processor module for each input and one processor module for each output, implemented in hardware and/or software) operate independently and in parallel (although the input processors must wait until the output processors have completed their part) to generate credits and determine matchings based on available credits. However, there is no continuous accumulation of credits in a token bucket. Hence, certain issues that must be dealt with in other scheduling algorithms, such as controlling the unbounded accumulation of credits when a particular virtual circuit has no packets to send, do not arise in the context of the present invention.

The invention directly supports scheduling of variable-length packets without fragmentation and reassembly. This is achieved by having an independent connection manager (a simple bookkeeping function which tracks the transmission of variable-length packets) in addition to the arbiter.

Accordingly, a high-speed input buffered packet switch includes a switch fabric (e.g., a crossbar switch or a network-based switch) for connecting input ports to output ports. Each input has an input pointer which references an output port, and each output has an output pointer which references an input port. An arbiter includes input and output credit allocators and a matcher. A single module may comprise one or more of the allocators and matcher. The input credit allocator resets input credits associated with input/output pairs and updates the input pointers. Similarly, the output credit allocator resets output credits associated with input/output pairs and updates the output pointers. The matcher matches inputs to outputs based on pending requests and available input and output credits. A scheduler schedules transmissions through the cross-bar switch according to the arbiter's matches.

For each input, the input credit allocator resets the number of input credits associated with that input and the output referenced by the input's input pointer, to a weight value associated with the input/output pair. This resetting occurs when any of certain conditions are true, for example, when the input/output pair has no input credits, or when there are no pending requests to connect the input/output pair through the switch. The condition that there be no pending requests may further be limited by the condition that the referenced output be available. In addition, the input credit allocator advances the input pointer.

Similarly, for each output, the output credit allocator resets output credits associated with that output and the input referenced by the output's output pointer, to a weight value associated with said input/output pair. This resetting occurs when any of certain conditions are true, for example, when the input/output pair has no output credits, or when there are no pending requests to connect the input/output pair through the switch. The condition that there are no pending requests may further be limited by the condition that the referenced input be available. In addition, the output credit allocator advances the output pointer.

In one embodiment, the input pointers and output pointers are round-robin pointers.

In one embodiment, the matcher includes a pre-select module which selects input ports for possible matching to output ports, and a bind module which binds at least some of the selected input ports to the output ports for which the input ports were selected. The pre-select module and bind module may be executed serially in plural iterations.

The pre-select and bind modules pre-select and bind inputs and outputs having at least one credit. In one embodiment, when unused inputs and outputs remain after all pairs with credits have been identified, additional inputs and outputs without credits may be pre-selected and bound so as to increase the size of the match. Borrow counts may be associated with the input/output pair to track borrowed credits when input-output matches are made without credits for the input/output pair.

An embodiment of the present invention includes a set of input borrow counters for tracking borrowed input credits, and a set of output borrow counters for tracking borrowed output credits. The input borrow counters and output borrow counters operate in conjunction with the input and output credit counters.

A common bit space may be dynamically shared between the borrow and credit counters at each output for each inbound stream, and at each input for each outbound stream. In one embodiment, this is implemented with hardware logic which dynamically locates a boundary between credit and borrow fields based on the most significant 1-bit of an associated weights register, during all manipulations involving credit and borrow counters.

A request generator sends, for each unlocked input port, a request to every output port for which the input port has a packet or cell awaiting transmission.

In an embodiment of the present invention, in which packets may be of variable length, a connection manager monitors on-going traffic between inputs and outputs, and updates the input and output credits based on the on-going traffic. A set of input and output lock indicators associated with the inputs and outputs indicate establishment of connections. These lock indicators are maintained across multiple time slots over packet transmissions.

An embodiment of the invention further includes a set of end-of-packet (EoP) indicators. Each EoP indicator indicates the end of transmission of a packet through an input associated with the EoP indicator. The connection manager resets the lock indicators associated with the input and output through which the packet is being transmitted, thereby releasing the ports for further arbitration.

The connection manager, for each input transmitting a packet, decrements the input and output credits associated with inputs and outputs through which transmissions are on-going, and detects ends of packets.

An embodiment of the invention may further include a start of packet (SoP) indicator associated with each input port. Each SoP indicator is set by its associated input port when a first byte of a packet transmitted from the input port reaches the crossbar switch. The SoP indicators may be monitored by the connection manager, which may delay decrementing of a credit until the associated SoP indicator is set.

An embodiment of the invention may further comprise: a set of output credit registers to track output credits, and a set of input credit registers to track input credits.

If packets are fixed-size cells, the arbiter may reset the input and output lock indicators at the beginning of each time slot, and the bind module may decrement credit for on-going transmissions. In this fixed-size mode, the arbiter itself manipulates borrows. For example, the bind module may further increment the number of borrows when necessary, while the prelude decrements borrows.

Additional embodiments may include "camp on" logic which issues requests in anticipation of completion.

For example, in one camp-on embodiment, the arbiter module uses "unlocked", "available" and "locked" status modes for each input, where an "available" input is an input through which a packet is currently being transmitted but which has not been scheduled for a next transmission. Any input that initiates a fresh packet transmission will transition into the "available" state, and once matched, will transition to the "locked" state, remaining in the "locked" state until the end of an on-going transmission.

In another camp-on embodiment, the arbiter module uses "unlocked", "available" and "locked" status modes for each input and each output. Upon receipt of a start schedule (Ssch) signal issued from a corresponding input module a fixed number of slots prior to an end of its ongoing packet transmission, the input receiving the Ssch signal transitions into the "available" state. The output currently receiving the packet also transitions into the "available" state.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

General

An embodiment of the present invention includes a new scheduling algorithm, referred to herein as a "weighted fair switch scheduler" (WFSS), for unbuffered crosspoint switch fabrics.

Figure 2:
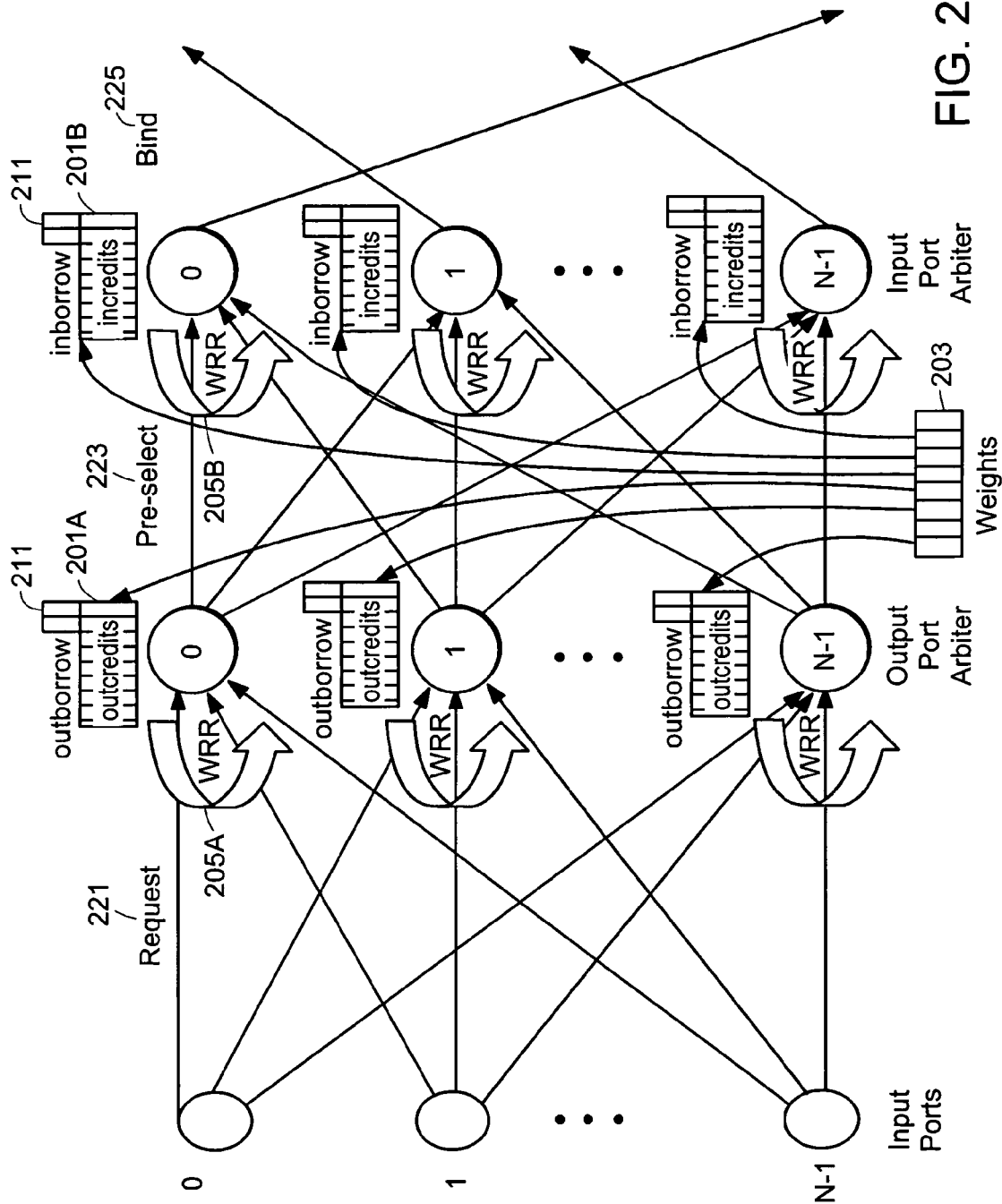
FIG. 2 is a schematic diagram of a WFSS process for an N×N switch for an embodiment of the present invention.

FIG. 2 is a schematic diagram of a WFSS process for an N×N switch. The WFSS algorithm is designed to allocate arbitrary weighted shares of the bandwidth of each output and input port to the competing traffic streams, as specified by the end user. In particular, non-identical throughput shares may be granted to the N inputs competing to send traffic to each of the N outputs (under backlogged traffic), as per a share matrix specified by the end user. In the absence of backlog (i.e., stable traffic), the WFSS algorithm provides the functionality to favor one traffic stream against another in terms of delay performance and jitter. WFSS marks a significant advance in supporting QoS-based applications in generalized switching environments, with varying bandwidth and performance requirements.

The basic prior art weighted round robin approach is implemented with a set of credit counters, one for each competing stream. These credit counters are loaded with a set of "weights" that are proportional to the respective throughput allocations. Access to the shared resource (i.e., bandwidth) is then provided in a round-robin fashion. A particular stream (as identified by a round-robin pointer) is given continuous access to the shared resource for an interval equivalent to an integral number of time slots, with the respective credit counter being decremented at the end of each slot.

Eventually, when the credit counter decrements to zero, it is reloaded from the respective weights register and the round robin pointer is advanced. Implementation of this basic principle however, offers some challenges in an N×N switching context. This is due to the fact that each of the $N^2$ traffic streams is constrained by two resources, namely the input port capacity and the output port capacity. These two sets of constraints interact with each other, leading to a multidimensional problem.

As shown in FIG. 2, to tackle this multi-dimensional problem, an embodiment of the present invention employs two distinct sets of credit counters 201: "outcredits" 201A, located at the output ports; and "incredits" 201B, located at the input ports.

Here, outcredits[k, j] refers to the credit counter associated with output k, that concerns the inbound traffic from input j (hence competing with other traffic for the bandwidth resource at output k). Thus, an array 201A of N output port credit counters (outcredits) is located at each output, and may be used in conjunction with an output round robin pointer outputptr[k] 205A for that output.

Similarly, incredits[j, k] refers to the credit counter at input j that applies to the traffic outbound for output k (hence competing for the bandwidth resource at input j). As with the output credits, an array 201B of N credit counters (incredits) is located at each input, operating in conjunction with an input round-robin pointer inputptr[j] 205B for that input.

The input and output credit counters 201 are loaded from an N×N matrix 203 of weights. Specifically, weights[j, k] contains the programmable value that should be loaded into incredits[j, k] and outcredits[k, j] at appropriate epochs as determined by the logic described below, in order to achieve the weighted throughput shares. Note that the epochs likely occur at different times for the inputs and the outputs, which are not typically examined at the same time, as discussed below.

The weights matrix forms the user interface for specifying the throughput shares. It can be populated by any set of positive integers satisfying the consistency requirement that the row as well as column sums equal a common constant.

Denoting the capacity of each input and output port by C, the goal is to deliver a bandwidth of $$\frac{\text{weights}[j,k]}{\sum_i \text{weights}[i,k]} C$$

to the traffic flow from each input j to each output k.

An example of a weights matrix for a 4×4 switch is shown below:

$$W = \begin{bmatrix} 30 & 50 & 10 & 10 \\ 20 & 10 & 40 & 30 \\ 20 & 30 & 25 & 25 \\ 30 & 10 & 25 & 35 \end{bmatrix}$$

Note that the row and column sums equal 100. Thus, if the capacity of each port equals 2.5 Gbps, then the following matrix gives the pair-wise throughput targets in Gbps:

$$Tpt = \begin{bmatrix} 0.75 & 1.25 & 0.25 & 0.25 \\ 0.5 & 0.25 & 1.0 & 0.75 \\ 0.5 & 0.75 & 0.625 & 0.625 \\ 0.75 & 0.25 & 0.625 & 0.875 \end{bmatrix}$$

Borrow counters 211 are discussed below.

As FIG. 2 illustrates, requests 221 are generated by the input ports. An arbiter then pre-selects (at 223), for each available output port, a requesting input for possible connection to the output port, based on output credits and borrows. More than one output may preselect the same input. The arbiter next binds (at 225) each of the preselected inputs to one of the outputs that preselected the input.

Figure 3A:
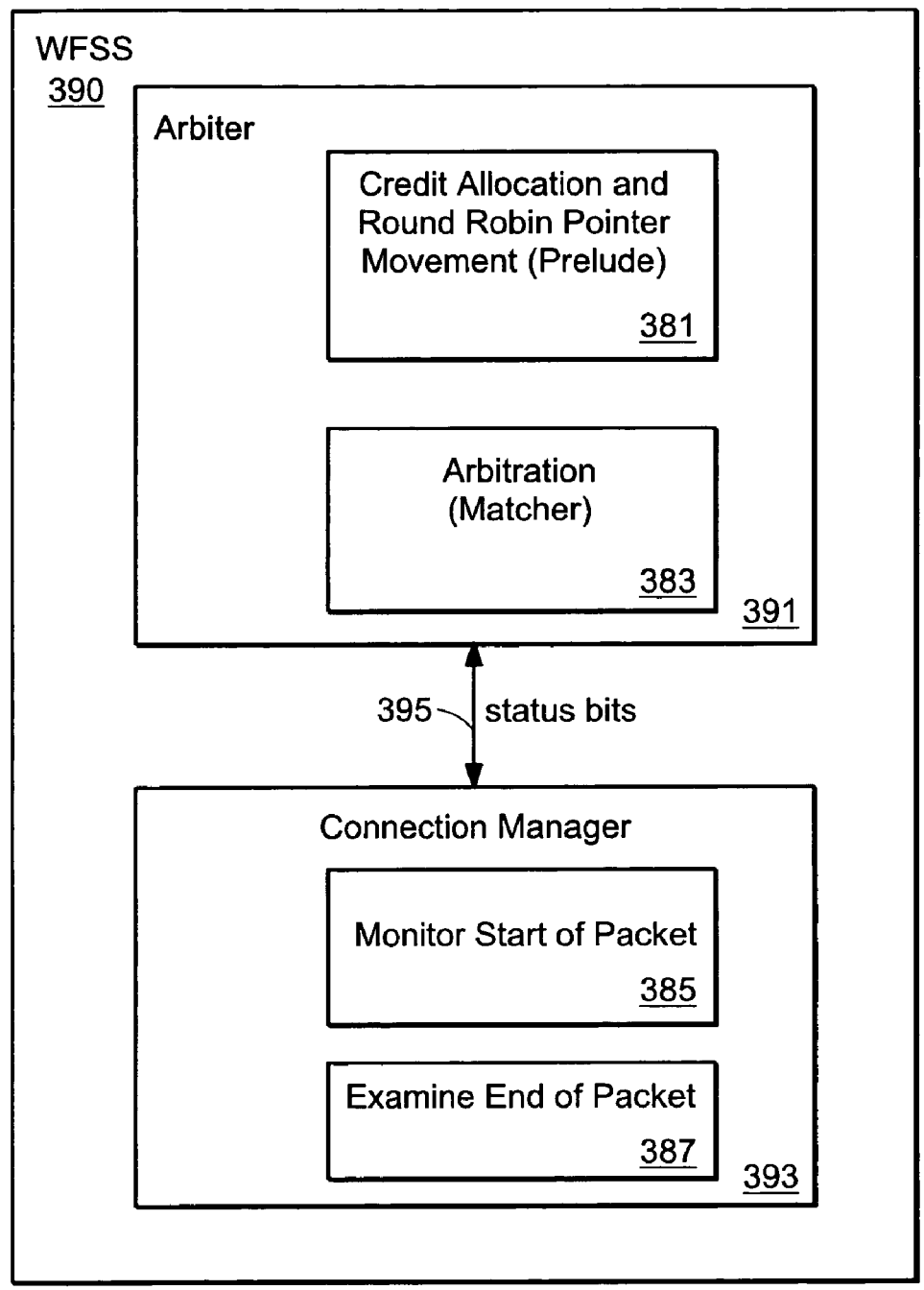
FIG. 3A is a block diagram of a WFSS embodiment of the present invention.

FIG. 3A is a block diagram of a WFSS embodiment of the present invention. WFSS 390 comprises two key functional modules: an arbiter 391 and a connection manager 393.

For scheduling variable length packets, the time axis is divided into slots of equal length, as in the case of cell-based systems. The transmission duration of each packet is assumed, for illustrative purposes, to span an integral number of slots. The arbiter 391 and connection manager 393 execute independently during each slot, and communicate with each other via appropriate status bits 395.

During any given slot, each input and output port is either locked, signifying that a packet transmission is in progress through that port; or unlocked, signifying that the port is free and hence available for a fresh arbitration sequence. The lock status of each port may be indicated by a lock bit or other indicator.

The connection manager 393 monitors ongoing packet transmissions during each slot. In particular, the connection manager 393 performs credit decrements for the input and output involved in each live packet transaction, and furthermore detects end of packet transmission (EoP) signaling messages, upon which it unlocks the respective input and output ports.

The connection manager 393 extends the scheduling capability of WFSS to the realm of variable-length packets. While the connection manager is conceptually present in cell mode (described below) as well, it becomes degenerate in this case since each cell transmission initiated during a slot is implicitly terminated at the end of the slot. In fact, a specialization of WFSS for cell mode, where a connection manager is not required, is discussed below.

The arbiter 391, on the other hand, operates only on the unlocked output and input ports, disregarding locked ports. It serves two key purposes, namely, (i) credit allocation and round robin pointer movement (performed within the "prelude" 381), and (ii) actual arbitration (by matcher 383), including repeated iterations of a preselect phase and a bind phase.

The WFSS Arbiter

The WFSS arbiter 391 determines a fresh schedule every cell time. To this end, the arbiter employs an iterative matching strategy for each new schedule, which is initiated at the beginning of each slot with a prelude.

Figure 3B:
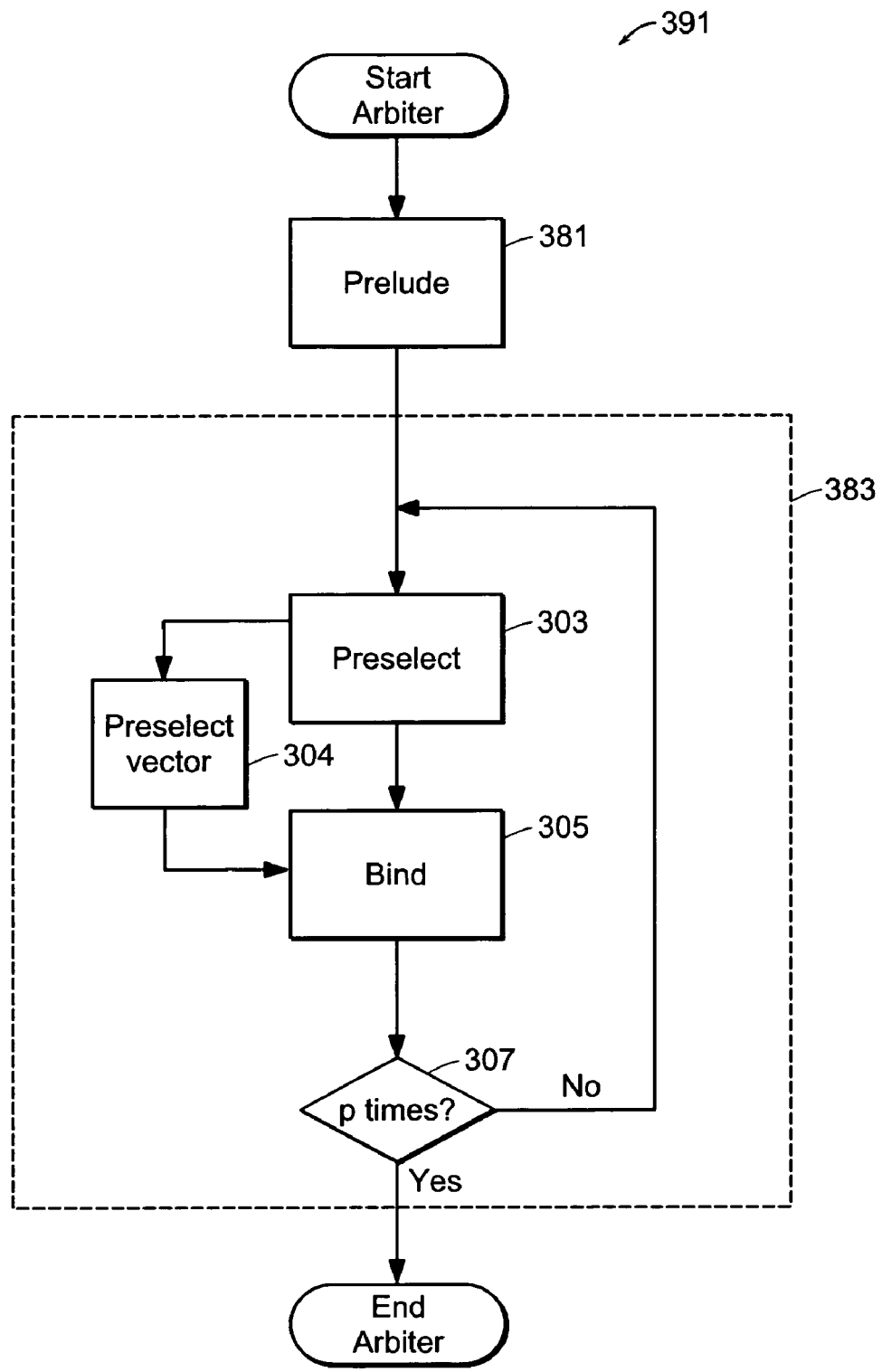
FIG. 3B is a high-level flowchart illustrating operation of the arbiter of FIG. 3A.

FIG. 3B is a high-level flowchart illustrating operation of the arbiter 391 of an embodiment of the present invention. As described in more detail below, the arbiter 391 consists of a prelude 381, which executes once at the beginning of each time slot, followed by "pre-selection" (or output arbitration) 303 and "bind" (or input arbitration) 305 phases which may be repeated over multiple iterations to achieve maximal efficiency, as determined at step 307.

Prelude

The credit allocation and round robin pointer movement function, or "prelude" 381, is executed independently and in parallel by every input and output port module at the beginning of each time slot.

Figure 3C:
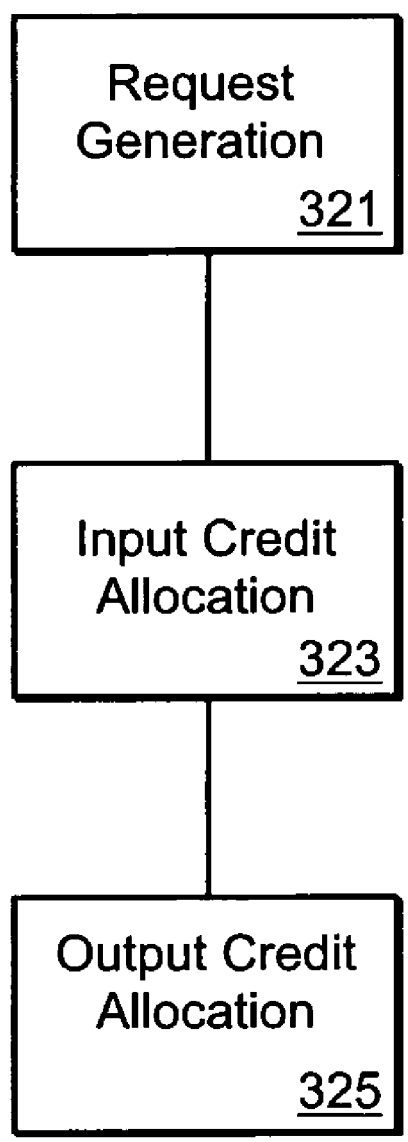
FIG. 3C is a flowchart illustrating the three major functions of the prelude of FIG. 3B.

FIG. 3C is a flowchart illustrating the three major functions of the prelude 381. These are: request generation 321, input credit allocation 323, and output credit allocation 325.

The prelude commences with request generation 321. Each unlocked input sends a request, independently and in parallel, to each output for which it has at least one packet or cell waiting in the respective VOQ. These requests may be latched into a request bit matrix.

Input credit allocation 323 and output credit allocation 325 then take place. One skilled in the art would recognize that the particular order in which input and output credits are allocated is arbitrary; in fact, these two functions may desirably be executed concurrently for maximal efficiency.

For output credit allocation 325, the credit counter at each unlocked output k (e.g., outcredits[k, j], where input j is pointed to by the local round robin pointer outputptr[k]) is examined. If zero, then this counter is loaded from the respective weights register, and the round robin pointer outputptr[k] is advanced to the next position. The output credit counter associated with the next position is not examined until the next time slot.

The same action may be taken if the corresponding request bit is zero. This strategy is adopted since the weighted fair share principle is intended to provide throughput shares to active streams in proportion to their respective weights, and therefore the idle streams should be skipped over.

These actions are executed concurrently at all N outputs. Simultaneously, an analogous sequence of concurrent actions is executed at all of the inputs as well.

Figure 4:
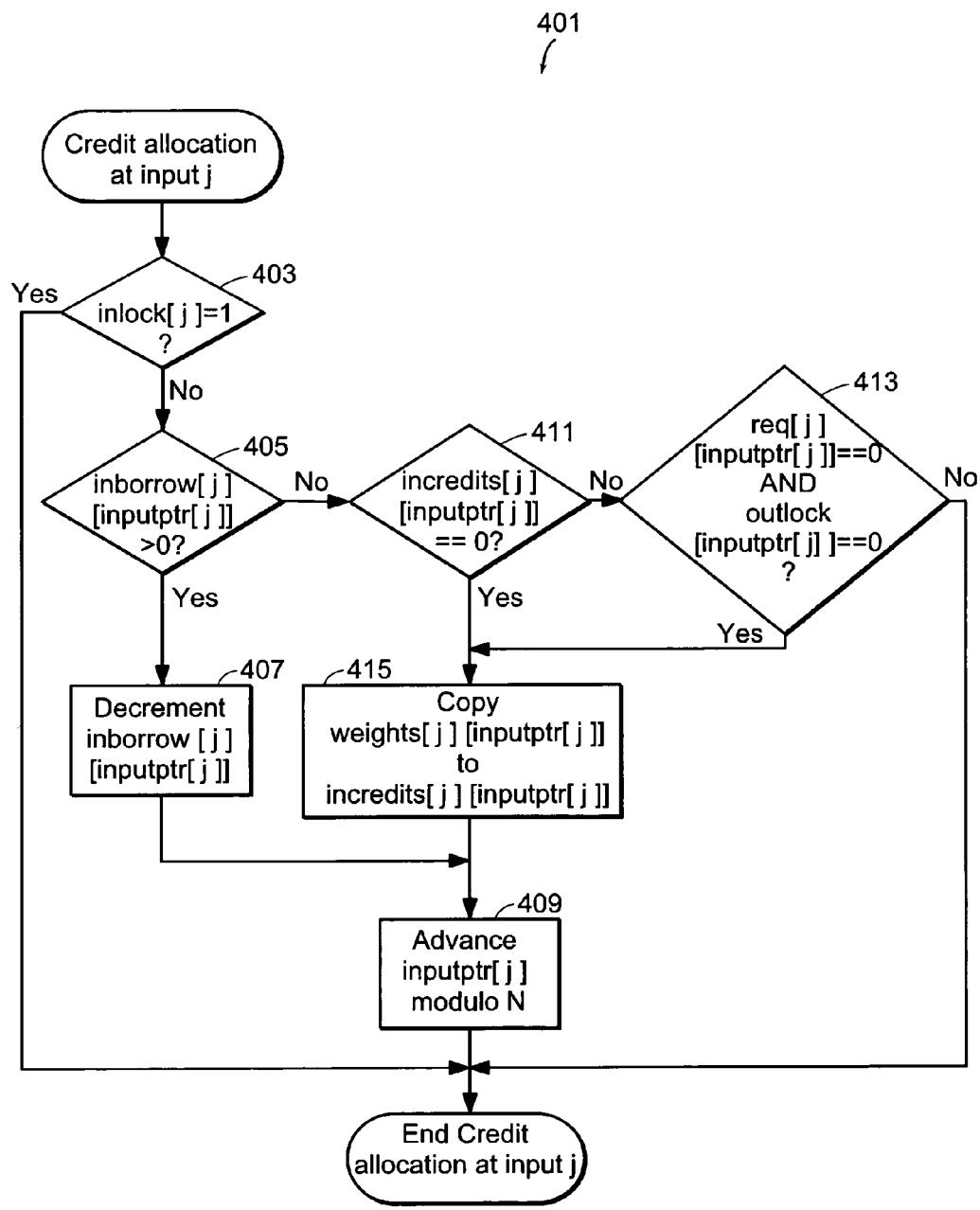
FIG. 4 is a flowchart illustrating operation of the input credit allocation function of FIG. 3C for a particular input j.
Figure 5:
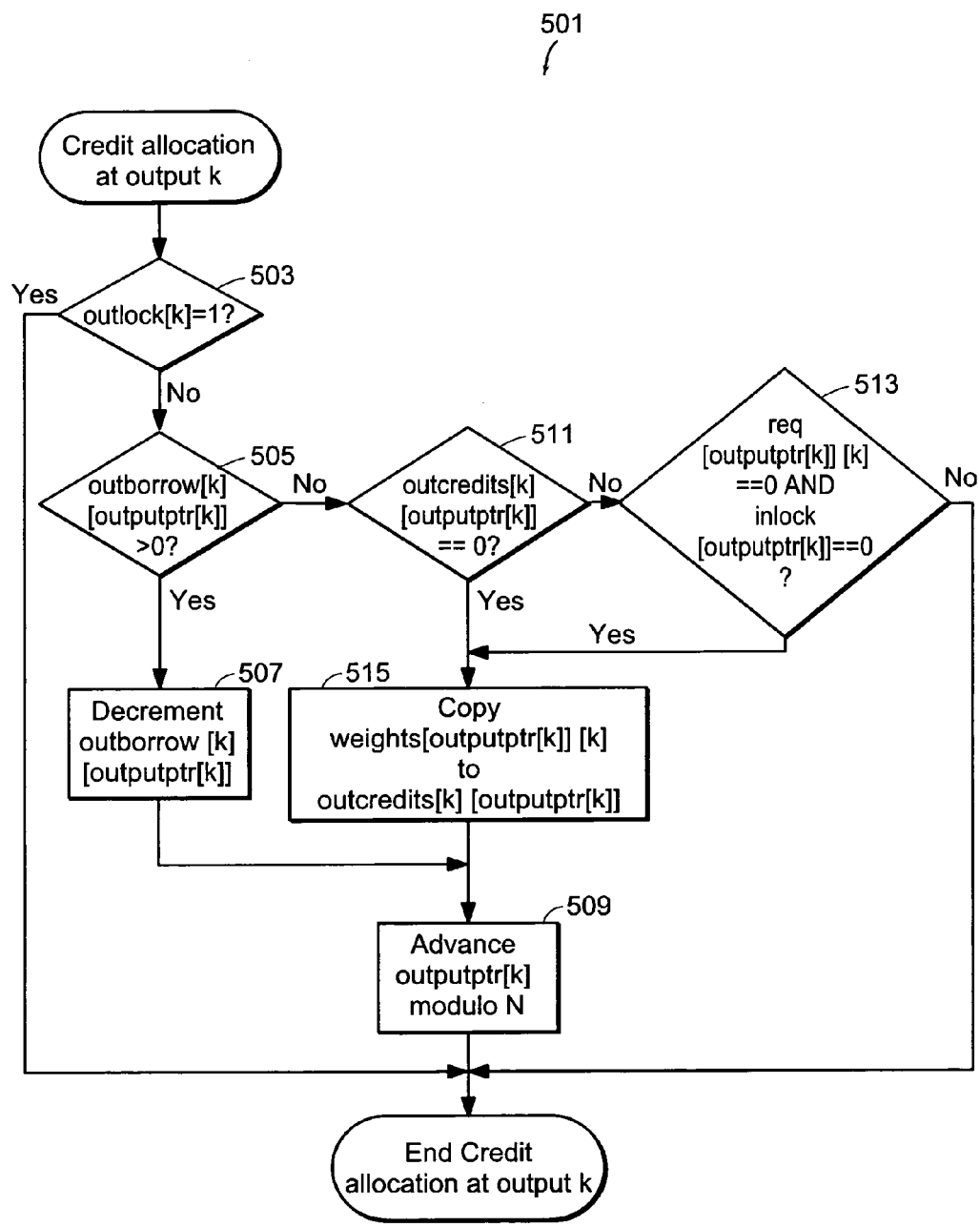
FIG. 5 is a flowchart illustrating operation of the output credit allocation function of FIG. 3C for a particular output k.

FIGS. 4 and 5, discussed below, provide additional details of the respective input and output credit allocation processes.

Credit borrows are discussed later.

Arbitration Function 383 (FIGS. 3A and 3B)

The prelude 381 is followed by a sequence of p iterations (for some value p≦N) of pre-selection 303 and binding 305 phases. At the end of each iteration, a subset of requesting inputs is matched and bound to a subset of outputs in a conflict-free manner. These inputs and outputs are eliminated from consideration during subsequent iterations, by setting the respective lock indicators. In other words, successive iterations attempt to increase the number of input/output matches.

Arbitration Pre-selection Phase

The pre-selection phase 303 for a given (unlocked) output k is aimed at selecting a candidate (unlocked) input match. Absolute priority is given first to inputs with credits (i.e., {j such that outcredits[k,j]>0}). Each output records its choice in a pre-select vector 304. The same input may be picked by multiple outputs during this phase. The search proceeds in round-robin fashion, starting from the location indicated by the corresponding output round-robin pointer outputptr[k].

During the pre-select phase of each iteration, every unlocked output for which there is at least one pending request pre-selects one of the requesting inputs. An initial attempt is made to pick the first input that has both a request and positive credits (as indicated by the corresponding outcredits register), starting from the input indicated by the round robin pointer for that output (i.e., outputptr[k] for output k).

Optionally, if no candidate input with credits can be found, then the first requesting input starting from the round robin position is picked in a secondary attempt, disregarding credits. This feature can serve to maximize the global scheduler throughput.

Experience indicates that disabling this option in the variable-size packet mode may promote better adherence to the target bandwidth shares in some traffic scenarios. Thus the inclusion of the optional secondary loop is a decision that may be made in the specific context of each application scenario. The input selected through the pre-select process is recorded in a pre-select register array (to be examined during the bind phase). Executions of the pre-select phase occur in parallel at all the unmatched outputs.

Arbitration Bind Phase

During the bind phase, for a given input j to resolve the conflict (if any), an absolute priority is given first to those outputs that pre-selected input j and that have credits (i.e., {k such that incredits[j, k]>0}). The search proceeds in round-robin fashion, starting from the location indicated by the pointer inputptr[j].

Each input that has been pre-selected by at least one output port locks in on one of the candidate outputs. This is done in a manner analogous to the pre-select phase, albeit utilizing input credit counters and the input round robin pointers. Again, inclusion of a secondary loop to bind a pre-selected output disregarding credits, if none with credits can be found, is an optional extension. Once a successful match is established between an input j and output k, input j as well as output k are removed from further consideration by setting the corresponding lock bits.

Furthermore, a connection from input j to output k is added to the connection configuration matrix identified during the current time slot, and a request grant signaling message is scheduled to be sent to input j, indicating that a connection to output k has been granted.

WFSS Connection Manager

The connection manager 393 (FIG. 3A) focuses on locked inputs and outputs that are involved in live packet transmissions. To this effect, the binding of each locked input j is recorded in a register match[j], which indicates the output port to which input j is currently transmitting a packet.

The connection manager 393, operating independently and concurrently on each locked input j and the output to which input j is currently connected, has two functions. It first monitors (block 385) the start of packet bit to determine if the packet transmission has already commenced, in which case it decrements the credit counters (after performing a borrow if necessary). Next it examines (block 387) the end of packet bit to determine whether the current slot is the final slot of the ongoing packet transmission, in which case the connection manager 393 tears down the connection and unlocks the input and output.

For example, during each time slot, the connection manager 393 examines each locked input. So, for input j, the connection manager first decrements (if positive) the credit counter incredits[j, p] for input j (where p=match[j]) and the credit counter outcredits[p, j] at output p, to which input j is presently connected. This effects a "cost deduction" for the ongoing packet transmission during the current slot, corresponding to both the input and the output resources it is consuming.

The connection manager examines the end-of-packet signaling indicator EoP[j] for input j. If an end-of-packet is not indicated, then no further action is necessary. If an end-of-packet is indicated, then both input j and the output to which it is transmitting, i.e., as indicated by match[j], are unlocked, and made available for fresh arbitration.

Furthermore, the connection between input j and output match[j] is deleted from the connection matrix. Credit borrows are discussed below.

The connection manager serves two purposes. First, it accounts for bandwidth "consumed" by an ongoing transmission. This is accomplished for each locked input j by decrementing, every cell time, the number of input credits and the number of output credits associated with the ongoing transmission, i.e., incredits[j, p] and outcredits[p, j], where p=match[j] is the output matched to input j.

In addition, the connection manager unlocks ports whose packet transmissions are terminating in the current time slot. For this purpose, the connection manager examines an indicator EoP[j] that indicates an end of packet. If an end of packet is indicated for input j, the lock indicators corresponding to input j and output p are reset, making them available for a fresh sequence of arbitration, and possible credit allocation.

Credit Borrows

To summarize, the WFSS algorithm arbitrates and initiates fresh packet transmissions, giving preference to virtual queues with positive credits to start using both the respective input and output ports. The WFSS algorithm also maintains each connection for the duration of each packet, tearing down the connection when the end of packet is detected. Furthermore, the WFSS algorithm deducts the "cost" of transmission of each packet from the respective input and output credit pool.

The WFSS algorithm also replenishes the credit pools in a manner geared to achieving the exact throughputs under full backlog, as stipulated by the contract specified in terms of the programmed weights. Under partially backlogged conditions, WFSS ensures that each backlogged stream gets a throughput equal to or greater than the contract, and that the traffic from each non-backlogged stream is carried in its entirety.

Optionally, the pre-select 303 and bind phases 305 of the arbiter 391 may allow the selection of inputs and outputs without credits if none of the available candidates have any credits, pending the next reload. Without this feature, some inputs and outputs could be forced to be unduly idle based merely on credit considerations, leading to overall throughput degradation.

On the other hand, if ports are occasionally matched disregarding credits, then packet transmissions can potentially occur with zero credits, thereby leaving no room for the proper accounting of the bandwidth consumed by such packets. In fact, this can happen even if a packet transmission is initiated with positive input and output credits, if one or both of these counters decrement to zero midway through the transmission.

Clearly, such incidences would adversely interfere with the precision of the credit mechanism. An embodiment of the invention compensates for such anomalies by allowing credits to be "borrowed" from the future, whereby a packet stream that obtains service without credits is required to "pay back" those credits in the future.

Accordingly, if one or both of the credit counters associated with a live packet transmission is found to be zero during connection management, then a credit is deducted against future allocation. Cost considerations dictate that such capabilities should be implemented using simple load and increment/decrement operations, although actual hardware adders or subtracters could be used.

To implement this capability, a credit borrow counter 211 (FIG. 2) is associated with each credit counter 201. If a credit counter that should be decremented by the connection manager is zero, then it is immediately reloaded with a full quantum of credits from the respective weights register (and decremented to account for the current transmission slot), and the associated borrow counter is incremented.

When the arbiter prelude module considers this stream for credit replenishment at some future epoch, it may examine both the credit and borrow counters. If the borrow counter is positive, it is simply decremented (i.e., accounting for a credit debt from the past). If the borrow and credit counters are both zero, then the credit counter is reloaded with the proper weight. Otherwise, no action is taken.

During the pre-select and bind phases of the arbiter, the availability of credits is signaled by the conditions that the credit counter is positive and that the credit borrow counter is zero. As is clear, there is a borrow counter outborrow[k, j] at each output port k corresponding to traffic inbound from input j, and a borrow counter inborrow[j, k] at each input port j corresponding to traffic outbound to output k.

A requirement for the efficacy of the borrow mechanism is that the borrow counters do not reach their maximum limits (as determined by bit allocation) too often. Intuitively, borrow counters associated with credit counters with small weights are likely to be incremented far too often and run the risk or saturation, compared to those with large weights.

To provide robustness for small weights, a large bit allocation is needed for the borrow counter, while most of the bit space allocated to the corresponding credit counter remains unused. Conversely, when a large weight is used, most of the bits allocated for the borrow counter remain unused.

An embodiment of the invention recognizes this tradeoff and dynamically partitions a common bit space allocated to each pair of credit and borrow counters, depending on the setting of the respective weights register. Specifically, if b is the bit length of the shared bit space, and w is the weight, then the credit counter part requires only $\lfloor \log_2(w) \rfloor + 1$ bits, where $\lfloor x \rfloor$ denotes the integer part of any real number x. The remaining $b - \lfloor \log_2(w) \rfloor$ bits can be allocated for the borrow part.

In other words, if c denotes the most significant 1-bit position of w, then bits 0, . . . , c are treated as the credit part, and bits c+1, . . . , b−1 are treated as the borrow part. Hardware logic may be used to dynamically map the value stored in the weights register to the boundary between the credit and borrow fields, during each instance it manipulates these variables. It is clear that this arrangement maximizes the bit space available for the borrow counter when the weight is small, and assigns as many bits as needed to the credit counter in order to accommodate large weights (when occurrences of borrow tend to be seldom).

Figure 3D:
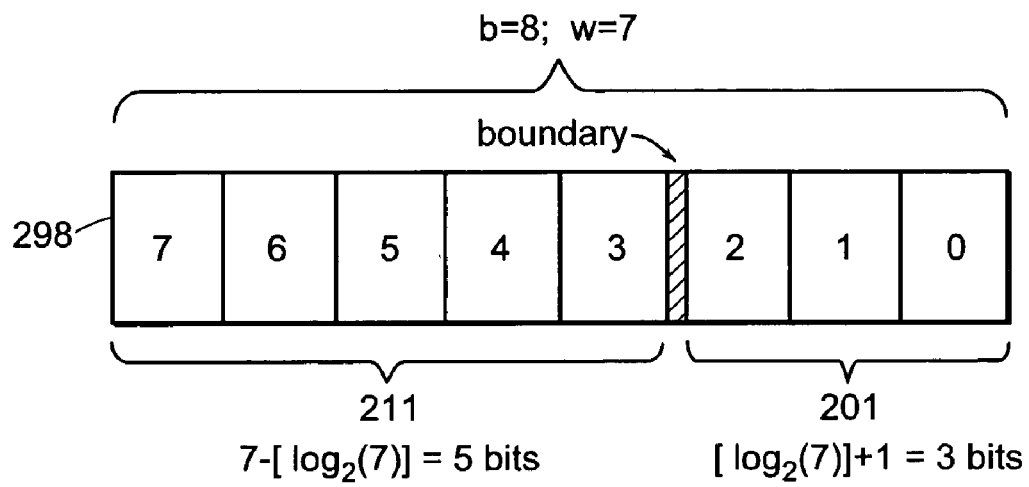
FIGS. 3D and 3E are schematic diagrams that illustrate how credits and borrows for different input/output paths having different weights can share a common space in two different counters.
Figure 3E:
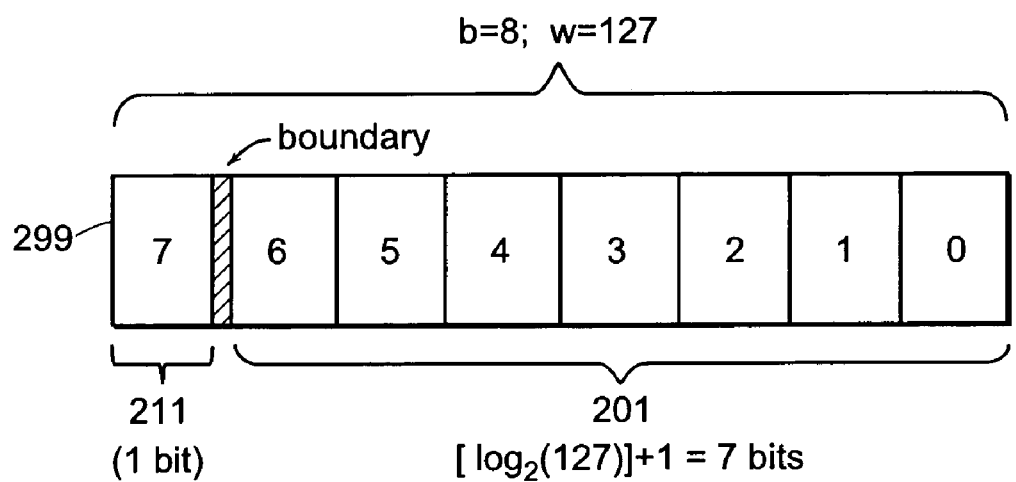

FIGS. 3D and 3E illustrate this concept for two counters 298, 299, each having a shared bit space of 8 bits, but different respective weights w=7 and w=127. It can be seen that, although each counter 298, 299 consists of b=8 bits, the credit counter portions 201 are of different lengths which depend on the weights, and the borrow counter portions 211 are also of different lengths.

Specialization to Cell Mode

In "cell mode", all packets are of a fixed length equivalent to one slot, and there is no need to include a distinct connection manager. Specifically, the lock status indicators are initialized to the unset position at the beginning of each cell slot (as part of the prelude), and are set only to remove inputs and outputs that are already matched from further consideration during subsequent iterations within the same arbitration cycle. These indicators have no meaning over multiple cell slots. Furthermore, the decrements to the credit counters (and increments to the borrow counters as needed) are performed only once for each cell, during the single slot when it is transmitted. Thus, the decrement operations may be rolled into the arbiter module (as part of the bind operation).

Details

At the Gigabits/sec link rates that are of practical interest, the propagation between the ports and the scheduler could be equivalent to multiple (for example, several tens of) slots.

This implies that there is a time lag of several slots between the instant a connection is made between an input and output, and the beginning of packet transmission. It is fair to conclude that the ports remain unused during this lag, and this constitutes an overhead on the bandwidth. Depending on the quantitative relationship between packet length distributions and propagation latencies, the impact on the overall throughput efficiency can potentially become significant.

A second implication is that if credit decrements were to begin right from the setup instant of a new connection, this would add a static offset to the "cost" incurred by each packet. This would in turn compromise the precision of bandwidth allocation in relation to the target shares.

For example, if the round trip delay is ten slots, then a packet equivalent to one slot and another equivalent to two slots would incur credit costs of 11, and 12, respectively. In other words, they would be tariffed in a nearly identical manner, even though the second packet has a bandwidth impact twice as much as the first packet.

To correct for this error, an embodiment of the present invention makes use of a start of packet (SoP) signaling message, similar to the EoP signaling message, from the input port. An SoP is expected to coincide with the arrival of the first byte of the packet subsequent to connection setup and grant issuance. Credit decrement is withheld following connection setup, until the SoP is received.

Throughput overhead ensuing from propagation latency, in the context of variable length packets, is a direct consequence of a lack of pipelining between request transmission/scheduling and transmission of the packet payload. Note that the fixed transmission duration in "cell" (i.e., fixed length) mode naturally allows full pipelining between these two activities, as discussed below; thus in cell mode there is no overhead due to latency.

One way to overcome this drawback in the variable length packet context is to incorporate the ability to issue requests in advance, thereby achieving a certain degree of pipelining between request generation/processing and packet transmission. Two enhanced versions of the WFSS algorithm that achieve this goal are described below under the heading "WFSS packet scheduler with camp on."

The following notation is used to aid in a precise description of an embodiment of the WFSS algorithm:

N: The number of switch ports (input as well as output)

p: The number of iterations per arbitration cycle (i.e., number of times the pre-select and bind sequence is executed).

outlock[k]: An indicator bit which indicates whether output k is available for arbitration or not, where k=0, . . . , N−1. In the general variable-size packet mode, outlock[k] is set to one by the arbiter when output k is matched with some input during the bind phase. It remains set across multiple slots depending on the packet duration, and is reset (for example, to zero) by the connection manager when an explicit EoP signal is received. In cell mode, outlock[k] is set (for example, to one) by the arbiter when output k is matched with some input during the bind phase in some iteration, so that it will not be considered for arbitration during subsequent iterations of the same cycle, if any; it is always reset to zero during the prelude of each arbitration cycle.

inlock[j]: An indicator bit which indicates whether input j is available for arbitration or not, where j=0, . . . , N−1. In the general variable-size packet mode, inlock[j] is set to one by the arbiter when input j is matched with some output during the bind phase. It remains set across multiple slots depending on the packet duration, and is reset to zero by the connection manager when an explicit EoP signal is received. In cell mode, inlock[j] is set to one by the arbiter when input j is matched with some output during the bind phase in some iteration, so that it will not be considered for arbitration during subsequent iterations of the same cycle, if any; it is always reset to zero during the prelude of each arbitration cycle.

outputptr[k]: The round-robin arbitration pointer at output k, k=0, . . . , N−1.

inputptr[j]: The round-robin arbitration pointer at input j, j=0, . . . , N−1.

incredits[j, k]: The credit counter at input j that meters traffic destined for output k. In one embodiment, incredits[j, k] shares bit space with inborrow[j, k], with the boundary being determined by the most significant 1-bit position of weights[j, k].

inborrow[j, k]: The borrow counter at input j corresponding to traffic destined for output k.

outcredits[k, j]: The credit counter at output k that meters traffic originating from input j. In one embodiment, outcredits[k, j] shares bit space with outborrow[k, j], with the boundary being determined by the most significant 1-bit position of weights[j, k].

outborrow[k, j]: The borrow counter at output k corresponding to traffic originating from intput j.

weights[j, k]: The user programmable credit reload register associated with traffic from input j to output k. Both incredits[j, k] and outcredits[k, j] are loaded from weights[j, k].

req[j, k]: The request indicator corresponding to input j and output k indicates the availability of one or more packets pending transmission in the VOQ at input j for output k.

1: Bit string of all 1s, indicating the maximum allowed value of the variable in question.

match[j]: The index of the output port to which input port j is currently connected (monitored by the connection manager when a packet transmission is in progress).

SoP[j]: A single bit set by a start of packet signaling message from input j to coincide with the arrival of the first byte of the packet across a new connection that was just established from input j to the output port indicated by match[j].

EoP[j]: A single bit set by an end of packet message from input j to coincide with the last slot of the ongoing packet transmission from input j to the output indicated by match[j].

connect[j, k] A bit to indicate whether the crossbar hardware should establish a connection from input j to output k, or whether the connection should be torn down.

Of course, indicators are not limited to a single bit.

The WFSS Arbiter

FIG. 3B is a flowchart illustrating, at a high level, the operation of the WFSS arbiter 391. The WFSS arbiter is initiated by a prelude module 381, followed by p iterations of the pre-select 303 and bind 305 phases executed in that order. When p iterations have been performed, as determined at step 307, the arbiter terminates.

Note that all manipulations involving the credit and borrow counters assume a common bit space, with the boundary being dynamically detected using the most significant 1-bit (or set bit) of the corresponding weight, as described previously.

Prelude:

In the request generation function 321, each unlocked input j sends a request to every output k for which it has a cell or packet awaiting transmission. The submitted requests are recorded in the request matrix {req[j,k]}. For example, req[j, k] may be set to 1 if input j is unlocked and there is at least one packet awaiting transmission at input port j's virtual output queue that corresponds to output k. Otherwise, req[j, k] may be set to 0.

In one embodiment of the present invention, the input credit allocation function 323 is executed independently and in parallel by each unlocked input module j, concurrently with output credit allocation 325 at the outputs.

FIG. 4 is a flowchart 401 illustrating operation of the input credit allocation function 323 (FIG. 3C) of an embodiment of the present invention, for a particular input j. If input j is locked, as determined at step 403, the function terminates for that input.

Otherwise, if input j has borrowed credits (i.e., inborrow [j, k]>0, as determined at step 405 for k=inputptr[j]), then the borrow count (inborrow[j, k]) is decremented (step 407) and the round-robin pointer inputptr[j] is advanced modulo N (step 409).

On the other hand, if step 405 determines that there are no borrowed credits, and if a) it is determined at step 411 that there are no credits (i.e., incredits[j, k]=0), or b) no packets have requested transmission (req[j, k]=0) and output k is not available (outlock[k]=0) as determined at step 413, then the input credit counter incredits[j, k] is reloaded with the corresponding weights[j, k] (step 415) and the round-robin pointer inputptr[j] is advanced modulo N (step 409).

Otherwise, if there are credits and either there is a pending request or the referenced output is available, the input credit allocation function 401 terminates for that input j.

FIG. 5 is a flowchart illustrating operation of the output credit allocation function 325 (FIG. 3C) of an embodiment of the present invention, for a particular output k. This operation is similar to that illustrated in FIG. 4 for input credit allocation, with reference numbers 501-515 corresponding to reference numbers 401-415 respectively.

The basic philosophy adopted in both input and output credit allocation (executed independently and in parallel at the inputs and outputs) is to first examine the respective borrow counter (steps 405, 505). A positive (non-zero) value indicates a borrow of at least one quantum of credits (as specified by the respective weights register) in the past. Hence, credit allocation amounts to a deduction against the debt, achieved by decrementing the borrow counter (steps 407, 507).

If there is no borrow, but the credit counter is zero (determined at steps 411, 511), then a fresh quantum of credits is allocated by copying the respective weights register to the credit counter (steps 415, 515). This latter step is also taken if there are no pending requests at the remote (input or output) port being pointed to by the round robin pointer (determined at steps 413, 513), since the philosophy adopted is to skip over inactive ports (unless the referenced port is locked in an ongoing packet transaction).

Pre-select

In the arbiter's pre-select phase 303 (FIG. 3B), executed independently and in parallel at each unlocked output port that has received a request from at least one input, a first attempt is made to identify a requesting input with positive credits. If this attempt fails then, optionally, to improve throughput, a requesting input may be selected without taking credits into account. In either case, the round-robin search begins from the position indicated by the output round robin pointer.

Figure 6:
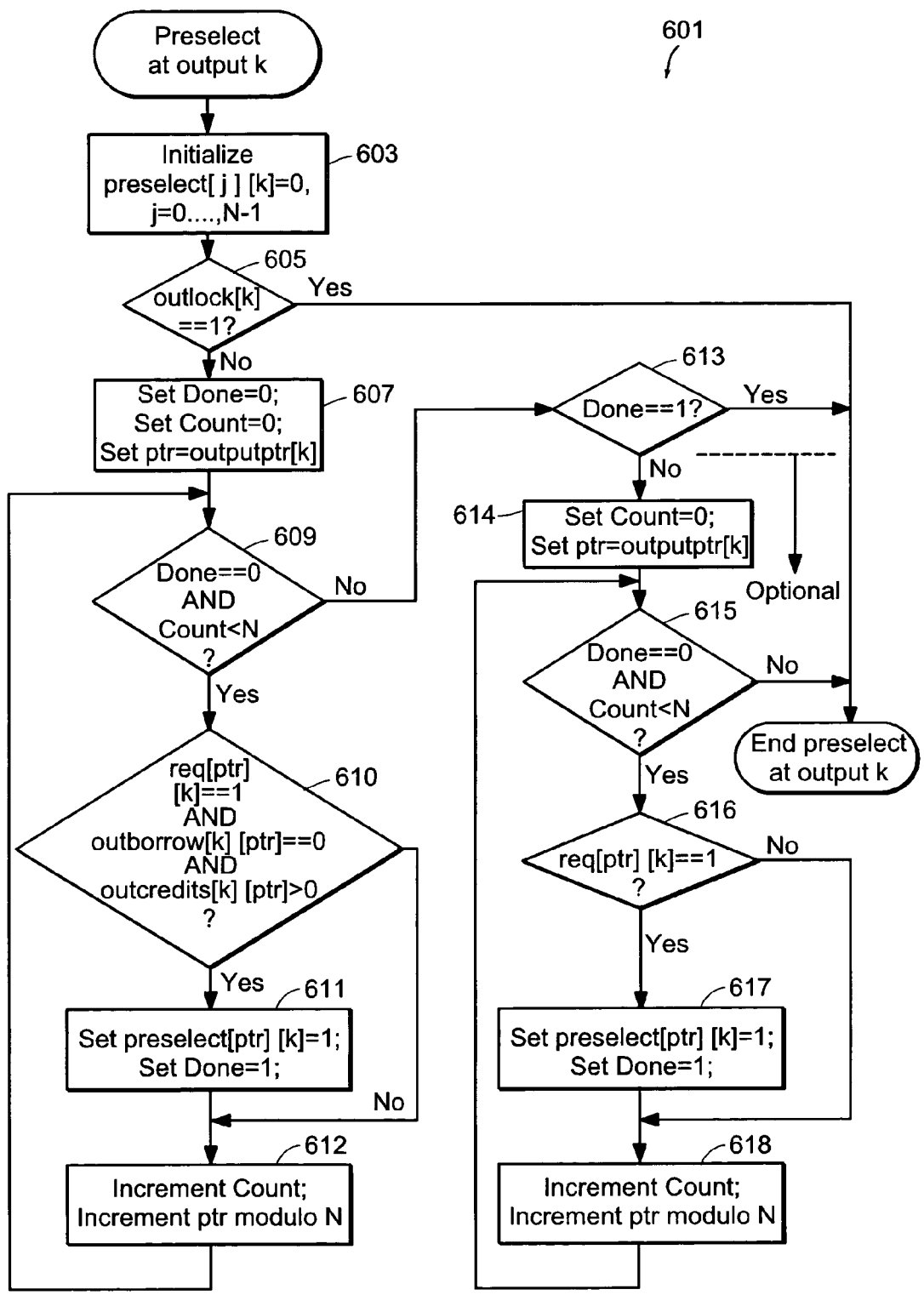
FIG. 6 is a flowchart illustrating operation of the pre-select function of FIG. 3B for a particular output port module k.

FIG. 6 is a flowchart 601 illustrating operation of the pre-select function for a particular output port module k. The pre-select function may be executed independently and in parallel by each unlocked output port module.

First, all entries for output k in a preselect bit matrix are initialized (step 603) to zero.

If the output k is locked, as determined at step 605, the function terminates for that output. If output k is unlocked (i.e., outlock[k]=0) and has at least one pending request from an input (i.e., req[j, k]=1 for some j), then output k attempts to select the first requesting input j such that outborrow[k, j] is zero and outcredits[k, j] is positive (steps 610, 611), in a round-robin fashion starting from the position indicated by the round-robin pointer outputptr[k]. (Steps 607-612.) Once such an input is selected (step 611), the pre-selection process terminates (steps 609 and 613).

Optionally, if no requesting input with credits can be found, then the first requesting input starting from the same position may be selected (steps 615-618), disregarding credit and borrow counters. Of course, the loop formed by steps 609-612 may itself track the first requesting input (disregarding credits) as well, simply throwing the information away if the positive credit balance requirement is met by another input.

The candidate input thus pre-selected may be flagged, for example, by setting the indicator preselect[j, k] to 1 (steps 611, 617); otherwise preselect[j,k] may remain 0.

Bind:

In the bind phase 305 (FIG. 3B), executed independently and in parallel at each unlocked input that has been pre-selected by at least one output, a first attempt is made to bind an output with positive credits that has pre-selected this input. If this attempt fails then, optionally to improve throughput, an output that has pre-selected this input may be bound without regard to credits. In either case, the round-robin search begins from the position indicated by the input round robin pointer.

Figure 7:
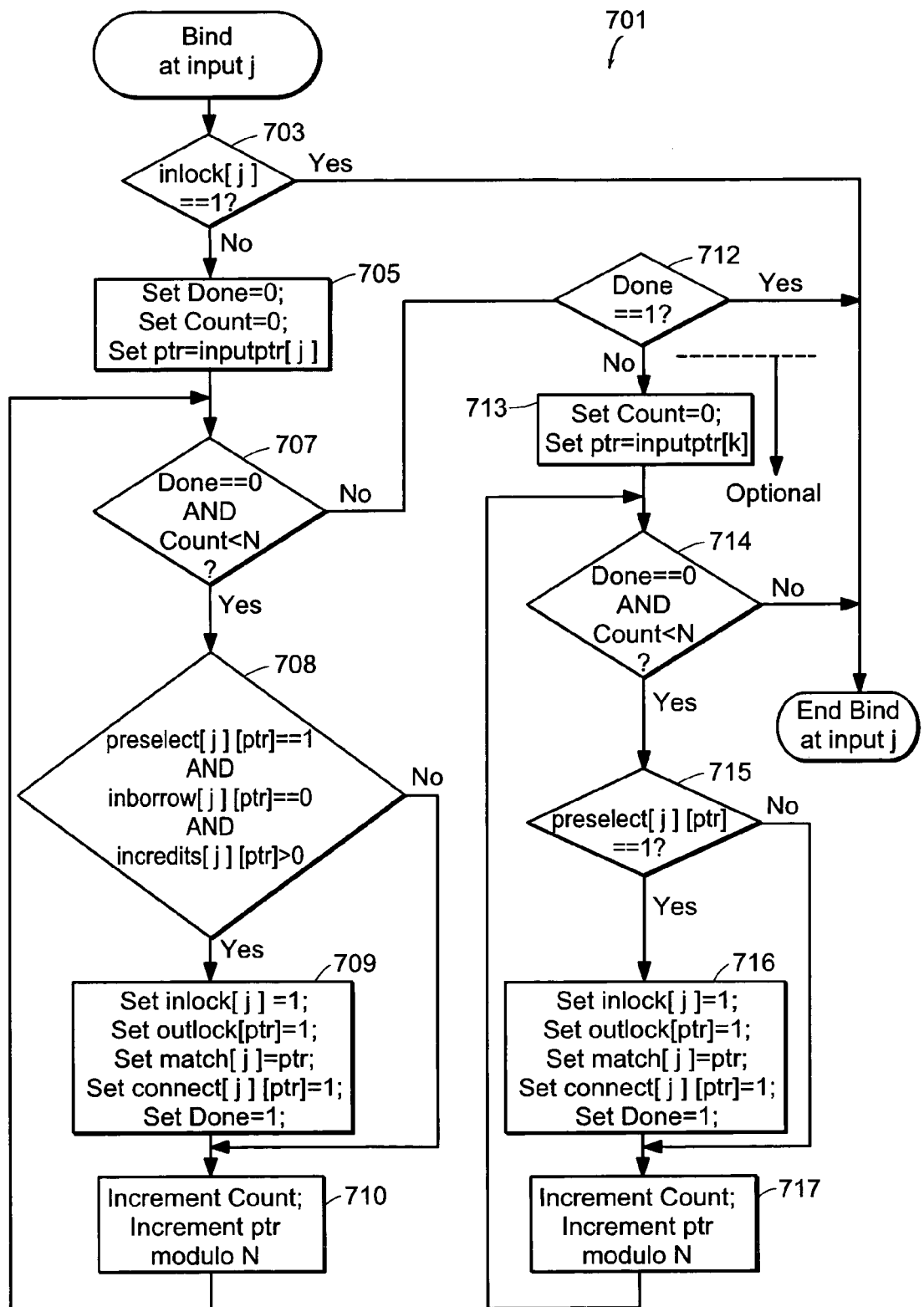
FIG. 7 is a flowchart illustrating operation of the bind function of FIG. 3B for a particular input j.

FIG. 7 is a flowchart 701 illustrating operation of the bind function for a particular input j. The bind function may be executed independently and in parallel by each unlocked input module.

If the input j is locked, as determined at step 703, the function terminates for that input. On the other hand, if input j is unlocked (i.e., inlock[j]=0) and has been pre-selected by at least one output (i.e., preselect[j, k]=1 for some k), an attempt is made to converge on the first output k that has pre-selected input j, and that has a positive credit balance (i.e., inborrow[j, k]=0 and incredits[j, k]>0), in a round-robin fashion starting from the position indicated by the round-robin pointer inputptr[j] (steps 705-710). Once such an output is selected (step 709), the binding process terminates (steps 707 and 712).

Optionally, if no such output can be found, then the bind function may be allowed to converge on the first output that has pre-selected input j, starting from the same position but disregarding credit and borrow counters. (Steps 713-717.) Of course, the loop formed by steps 707-710 may itself track the first output that has pre-selected input j (disregarding credits), simply throwing away the information if the positive credit balance requirement is met by another output.

Once the binding for output k is thus identified, input j and output k are both locked (steps 709, 716) by setting the bits inlock[j] and outlock[k] to 1, match[j] is set to k, and the connection matrix entry connect[j, k] is set to 1.

WFSS Connection Manager

Figure 8:
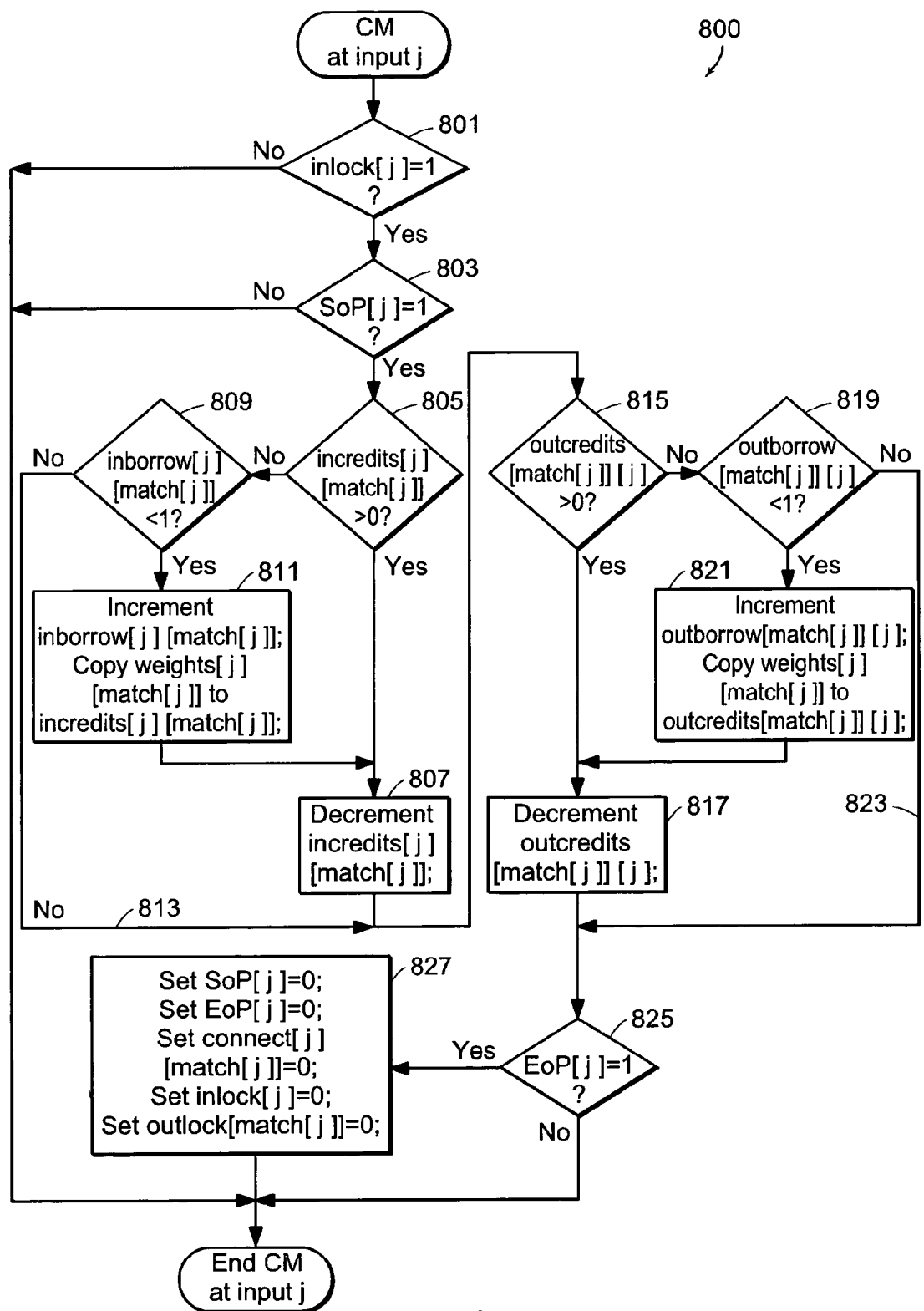
FIG. 8 is a flowchart illustrating operation of the connection manager of FIG. 3A.

FIG. 8 is a flowchart 800 illustrating the operation of the connection manager 393 (FIG. 3A). The connection manager 393 may be executed independently and in parallel by each locked input module j. Operation is illustrated in FIG. 8 for just a single input module j.

First, if an input module j is not locked (inlock[j]=0, as determined at step 801) or packet transmission has not begun (SoP[j]=0, as determined at step 803), the connection manager 393 terminates as to that input module.

Otherwise, if the input credit counter incredits[j, k] (where k=match[j]) is positive (as determined in step 805) then it is decremented (step 807). Otherwise, if inborrow[j, k] is less than 1, i.e., the maximum value allowed by the bit space allocated to it (determined at step 809), then at step 811, inborrow[j, k] is incremented and weights[j, k] is copied to incredits[j, k]. Then, at step 807, the number of incredits (incredits[j, k]) is decremented. Otherwise these two registers (i.e., incredits and inborrow) are left intact, as indicated by path 813.

Similarly, if there are one or more output credits (outcredits[k, j]>0), as determined at step 815, then the number of output credits is decremented (step 817). Otherwise, if outborrow[k, j] is less than 1, i.e., the maximum value allowed by the bit space allocated to it (determined at step 819), then outborrow[k, j] is incremented and weights[j, k] is copied to outcredits[k, j] (step 821). Then, at step 817, the number of outcredits is decremented. Otherwise these two registers (i.e., outcredits and outborrow) are left undisturbed, as indicated by path 823.

Note that w[j,k] is loaded into incred[j,k] and outcred[k,j], while w[k,j] is loaded into incred[k,j] and outcred[j,k].

If an end-of-packet is detected (EoP[j]=1) at step 825, then at step 827, SoP[j], EoP[j], inlock[j], outlock[k], and connect[j, k] are all reset.

This completes the description of the WFSS algorithm in the generalized variable-length packet environment.

Specialization of WFSS to Cell Mode

Some simplification can be made in the special case where all packets are of a fixed length (i.e., cells), referred to herein as "cell mode". In particular, the transmission duration of each cell equals exactly one time slot, and therefore, every new connection made during each slot in the cell mode is implicitly torn down at the end of the slot.

Thus the connection manager functionality becomes degenerate, and can be folded under the arbiter. Specifically, there is no need for the EoP and SoP signaling indicators.

Furthermore, the validity of the inlock and outlock indicators hold only for a single slot, and not across multiple slots. They function merely to prevent ports that have already been matched during a particular iteration within a slot from further consideration during subsequent iterations within the same slot. Therefore, these indicators are reset at the beginning of each slot, as part of a modified prelude.

Even though the transmission latency between the switch ports and the scheduler continues to manifest in the cell mode as well, this can be handled by an understanding that the connection matrix generated by arbitration during a given slot is applicable to the crossbar configuration d slots into the future, d being the round trip latency between the ports and the fabric. In this sense, there exists full pipelining between scheduler cycles and crossbar configurations, separated by a fixed time offset of d slots. Consequently, there is no bandwidth overhead caused by latency in the cell mode.

The essential modifications in the WFSS variant specialized to the cell mode are (a) the prelude now has a third additional step to reset all of the inlock and outlock indicators, with the remaining steps being the same except that there is no need to examine the lock indicators as in the packet case, and (b) credit decrements performed by the connection manager in variable-length packet mode may be integrated under the arbiter bind function, with the pre-select function being unchanged. With these additions to the arbiter, the connection manager may be eliminated in the cell mode.

As with the variable-length packet mode, the two loops of the pre-selection routine may be merged into a combined loop.

The prelude module augmented for the cell mode thus performs the following functions:

Port unlocking (executed concurrently at all input and output ports): Reset inlock[j] for each input j and outlock[k] for each output k.

Request generation: Each input j sends a request to every output k for which it has a cell awaiting transmission in the respective VOQ. The submitted requests are recorded in the request vector {req[j, k]}.

Input credit allocation (executed independently and in parallel by each input module j, concurrently with output credit allocation at the outputs): At each input j, if inborrow[j, inputptr[j]]>0, inborrow[j, inputptr[j]] is decremented and the round-robin pointer inputptr[j] is incremented modulo N. Otherwise if incredits[j, inputptr[j]] equals zero or if req[j, inputptr[j]] is unset, then weights[j, inputptr[j]] is copied to incredits[j, inputptr[j]] and the round-robin pointer inputptr[j] is incremented modulo N.

Output credit allocation (executed independently and in parallel by each output module k, concurrently with input credit allocation at the inputs): At each output k, if outborrow[k, outputptr[k]]>0, outborrow[k, outputptr[k]] is decremented and the round-robin pointer outputptr[k] is incremented modulo N. Otherwise if outcredits[k, outputptr[k]] equals zero or if req[outputptr[k], k] is unset, then weights[outputptr[k], k] is copied to outcredits[k, outputptr[k]] and the round-robin pointer outputptr[k] is incremented modulo N.

The arbiter bind (executed independently and in parallel by each unlocked input module j), augmented for the cell mode, performs the following functions:

Each unlocked input j (i.e., if inlock[j]=0) that has been pre-selected by at least one output (i.e., preselect[j, k]= 1 for some k) attempts to converge on the first output k that has pre-selected input j, such that inborrow[j, k] is zero and incredits[j, k] is positive, in a round-robin fashion starting from the position indicated by the round-robin pointer inputptr[j]. If none can be found with credits, then it converges on the first output that has pre-selected input j, starting from the same position but disregarding credit and borrow counters.

Once the binding output k is indicated, input j and output k are both locked by setting the bits inlock[j] and outlock[k] to 1, and the connection matrix entry connect[j, k] is set to 1. If the input credit counter incredits [j, k] is positive then it is decremented. Otherwise if inborrow[j, k] is less than 1, (i.e., the maximum value allowed by its bit space allocation) then inborrow[j, k] is incremented and weights[j, k] is copied to incredits[j, k], and the latter is decremented. Otherwise these two registers are left intact. Similarly, if the output credit counter outcredits[k, j] is positive then it is decremented. Otherwise if outborrow[k, j] is less than 1, then outborrow[k, j] is incremented and weights[j, k] is copied to outcredits[k, j], and the latter is decremented. Otherwise these two registers are left undisturbed.

As can be inferred, the status parameters {SoP[.]}, {EoP[.]} and {match[.]} are not needed in cell mode.

WFSS Packet Scheduler with "Camp On"

As observed earlier, WFSS, as applied in its basic form to the variable length packet environment, does not allow pipelining between the transmission/scheduling of requests, and the transmission of the packet payload. Depending on the durations of the port-to-scheduler propagation latencies in relation to packet sizes, this could potentially impose a non-trivial overhead on the overall bandwidth. Two enhancements of WFSS which may alleviate this limitation are now discussed, along with their ramifications.

In the basic WFSS described above, each input locked in an ongoing packet transmission must wait until the end of transmission before the next transmission request from that input can be considered for arbitration. The input then waits for the scheduling interval followed by another interval for the grant to propagate backwards. In other words, there are periods of time when switch inputs and outputs are committed and locked, while the concerned external input processor is withholding transmission pending receipt of the appropriate signaling message in transit.

One way to overcome the consequent detrimental impact on resources is to issue requests in anticipation (of completion). To be precise, assume that a given input is currently transmitting its i'th packet. According to the modified strategies now described, arbitration and grant return for the (i+1)'th packet can occur prior to completion of transmission of the i'th packet.

Strategy A (Imperfect Environmental Data)

One strategy that implements the pipelining capability enjoys the advantage of not requiring precise knowledge of the environment, such as latencies or scheduling interval durations. To implement this approach, a given input port can assume one of three status conditions, namely, "locked", "available", or "unlocked" (as opposed to only locked and unlocked in the basic version), while an output is either locked or unlocked as before.

In the unlocked mode, an input is neither transmitting a packet nor scheduled for one, and is available for arbitration. In the locked mode, an input is already transmitting a packet, and furthermore, has already been scheduled for the next transmission, hence unavailable for further arbitration.

Finally, in the available mode, an input is transmitting a packet but has not been scheduled for the next transmission, and is hence available for arbitration. Any input that initiates a fresh packet transmission immediately transitions into the available state. While in this state, it is available for arbitration of the next packet (as before, the occupancy status of all the VOQ's at the input is known to the scheduler). Once matched, it transitions to the locked state, and remains in that state until the end of the ongoing transmission.

From the perspective of the connection manager, an input in the available or locked state is treated in an identical fashion, since a packet transmission is in progress either way. From the perspective of the arbiter though, both unlocked and available inputs may be considered for arbitration. Only unlocked outputs are available for arbitration as before (there is no available status condition associated with outputs).

If an unlocked output is matched to an input in the available state, the former is said to "camp on" to the latter until the ongoing packet transmission at the input is completed. The moment the ongoing transmission ends, a fresh packet transmission from the concerned input to the output that is camping on can immediately start without incurring any propagation delay. At this point, the locked input again becomes "available", allowing arbitration for the next packet. If on the other hand, an input is unmatched for the next packet at the end an ongoing packet transmission, it enters the unlocked state.

While the above scheme overcomes the adverse effects of propagation latencies, an unlocked output can potentially camp on to an input in the available (but busy) state for extended periods, depending on how far prior to the end of the ongoing transmission the match was made. This could conceivably lead to another form of throughput inefficiency due to the outputs camping on busy inputs being forced to idle. Which approach yields superior results is indeed a function of the traffic and packet size distribution and the durations of the propagation latencies. Particular modes may be programmed to match specific application environments.

Strategy B (Perfect Environmental Data):

A different embodiment using another variant of the camp on strategy can be used to yield better results if additional knowledge is available on the switching environment. With this variant, besides the inputs, the outputs too assume an unlocked, available, or locked state. Furthermore, unlike in strategy A, each matched input and output that initiates a packet transmission is initialized to the locked state.

It is assumed that the round-trip propagation latency, the scheduling interval, and the packet length are all precisely known at the external input processor (to the slot granularity). Each input now issues a start schedule (Ssch) signaling message to the scheduler T slots prior to the (known) end of each ongoing packet transmission. Receipt of an Ssch signal transitions the respective fabric input into the available state (prior to which it was held in the locked state). In addition, the output that is currently receiving packet from the input that issued Ssch is also transitioned to the available state (which was held in a locked state thus far).

Upon successful arbitration and matching, the winning inputs and outputs are again returned to the locked states. With this arrangement, if T is precisely selected, then it is possible to perform scheduling of both inputs and outputs such that the propagation as well as the camp on overhead is completely eliminated, and the throughput is optimum.

Figure 1:
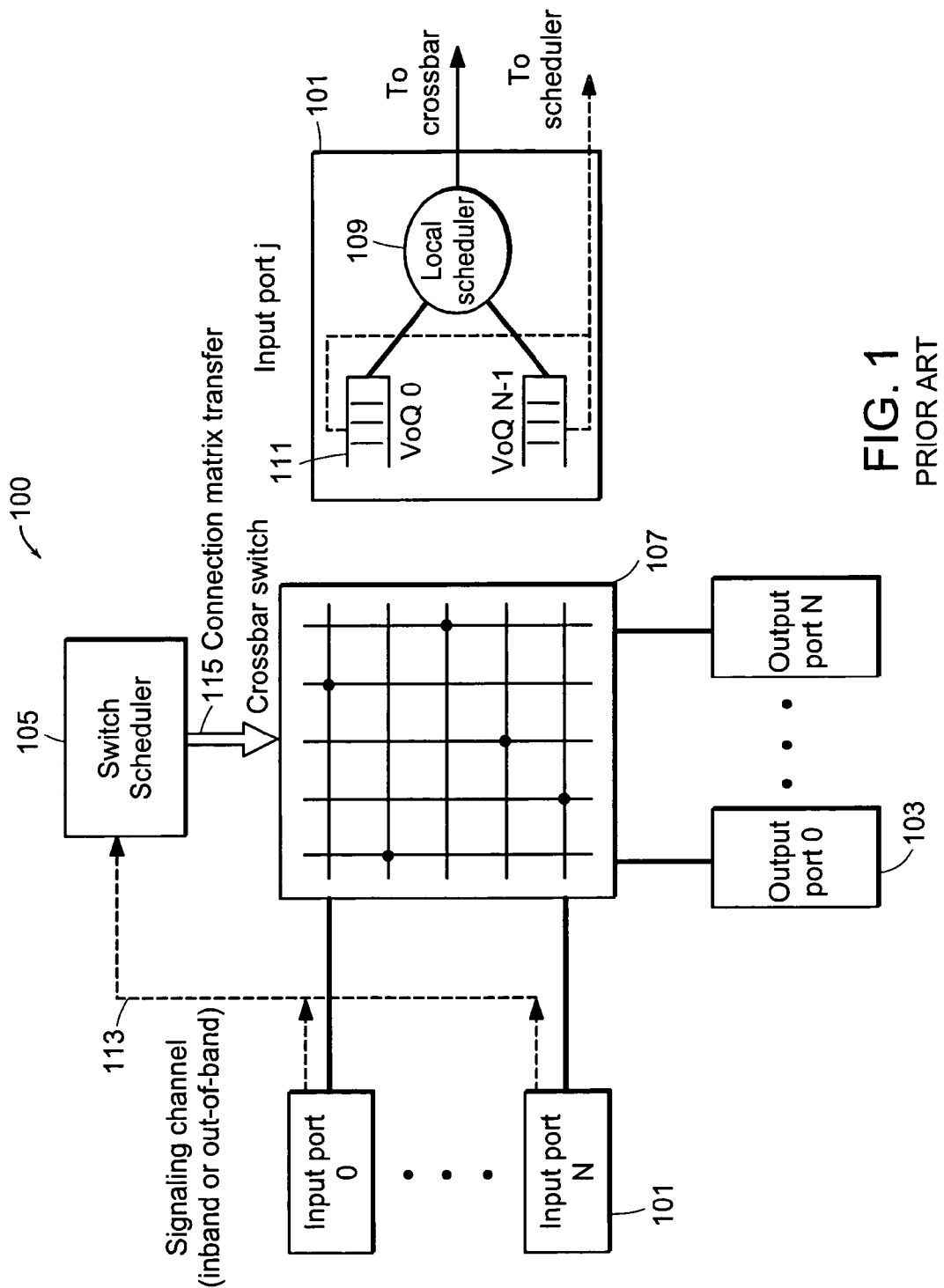
FIG. 1 is a schematic diagram illustrating a VOQ switch with N input ports and N output ports.

Finally, depending on the physical layout, the round-trip latency between the crossbar switch 107/scheduler 105 (see FIG. 1) and switch I/O cards or modules on which the input ports 101 and output ports 103 reside may consume several time slots. As a consequence, the connection matrix generated during a particular slot may be applicable to the crossbar configuration d slots into the future, d being the round-trip latency.

Where cells are of fixed size, this can be handled by implementing a fixed offset of d slots, with the scheduling and crossbar switching being fully pipelined. As a result, no bandwidth overhead is incurred due to latency.

A similar offset can be built into the variable-length packet scheduler 105 of an embodiment of the present invention as well, although the bandwidth overhead cannot be eliminated due to limits on the pipelining potential.

While this invention has been particularly shown and described with references to preferred embodiments thereof, it will be understood by those skilled in the art that various changes in form and details may be made therein without departing from the scope of the invention encompassed by the appended claims.

What is claimed is:

1. A high-speed input buffered packet switch, comprising:
   a switching fabric which connects input ports to output ports;
   for each input port, an input pointer which references an output port;
   for each output port, an output pointer which references an input port;
   an arbiter, comprising:
      an input credit allocator which resets input credits associated with input/output pairs, taking into account borrows incurred where a packet has been transmitted without credits, and which updates the input pointers,
      an output credit allocator which resets output credits associated with input/output pairs, taking into account borrows incurred where a packet has been transmitted without credits, and which updates the output pointers, and
      a matcher which matches inputs to outputs based on pending requests and available input and output credits; and
   a scheduler which schedules transmissions through the switching fabric according to the arbiter's matches.

2. The packet switch of claim 1, the input credit allocator, for each input, resetting input credits associated with the input and an output referenced by the input's input pointer, said input credits being set to a weight value associated with said input/output pair when one or more predefined conditions are true, the input credit allocator also advancing the input pointer.

3. The packet switch of claim 2, wherein the one or more predefined conditions comprise a condition selected from the group consisting of (i) said input/output pair has no input credits, and (ii) there are no pending requests to connect the input/output pair through the packet switch.

4. The packet switch of claim 3, wherein the condition that there are no pending requests is further limited by the condition that the referenced output is available.

5. The packet switch of claim 1, the output credit allocator, for each output, resetting output credits associated with the output and an input referenced by the output's output pointer, said output credits being set to a weight value associated with said input/output pair when one or more predefined conditions are true, the output credit allocator also advancing the output pointer.

6. The packet switch of claim 5, wherein the one or more predefined conditions comprise a condition selected from the group consisting of (i) said input/output pair has no output credits, and (ii) there are no pending requests to connect the input/output pair through the packet switch.

7. The packet switch of claim 6, wherein the condition that there are no pending requests is further limited by the condition that the referenced input is available.

8. The packet switch of claim 1, wherein the input pointers and output pointers are round-robin pointers.

9. The packet switch of claim 1, the matcher comprising:
a preselector which selects input ports for possible matching to output ports; and
a binder which binds at least some of the selected input ports to the output ports for which the input ports were selected.

10. The packet switch of claim 9, wherein the pre-selector and binder are executed serially in plural iterations.

11. The packet switch of claim 9, the pre-selector and binder pre-selecting and binding inputs and outputs having at least one credit.

12. The packet switch of claim 11, the pre-selector and binder pre-selecting and then binding inputs and outputs without credits, once no more pairs with credits can be found.

13. The packet switch of claim 1, wherein a borrow count is associated with the input/output pair to track borrowed credits when input-output matches are made without credits for the input/output pair.

14. The packet switch of claim 13, further comprising:
a set of input borrow counters for tracking borrowed input credits; and
a set of output borrow counters for tracking borrowed output credits, the input borrow counters and output borrow counters operating in conjunction with input and output credit counters.

15. The packet switch of claim 14, further comprising:
a common bit space dynamically shared between the borrow and credit counters at each output for each inbound stream, and at each input for each outbound stream.

16. The packet switch of claim 15, further comprising:
hardware logic which dynamically locates a boundary between credit and borrow fields based on the most significant non-zero bit of an associated weights register, during all manipulations involving credit and borrow counters.

17. The packet switch of claim 1, further comprising:
a request generator which, for each unlocked input port, sends a request to every output port for which the input port has a packet/cell awaiting transmission.

18. The packet switch of claim 1, packets being of variable length, further comprising:
a connection manager which monitors on-going traffic between inputs and outputs, and which updates the input and output credits based on the on-going traffic.

19. The packet switch of claim 18, further comprising:
a set of input and output lock indicators associated with the inputs and outputs that indicate establishment of connections, and that are maintained across multiple time slots over packet transmissions.

20. The packet switch of claim 19, further comprising:
a set of end-of-packet (EoP) indicators, each EoP indicator for indicating an end of transmission of a packet through an input associated with the EoP indicator, the connection manager resetting lock indicators associated with the input and output through which the packet is being transmitted, thereby releasing ports corresponding to the reset lock indicators for further arbitration.

21. The packet switch of claim 18, the connection manager, for each input transmitting a packet, decrementing the input and output credits associated with inputs and outputs through which transmissions are on-going, and detecting ends of packets.

22. The packet switch of claim 18, further comprising:
a start of packet (Sop) indicator associated with each input port, each SoP indicator being set by its associated input port when a first byte of a packet transmitted from said input port reaches the switching fabric, the SoP indicators being monitored by the connection manager, decrementing of a credit by the connection manager being delayed until the associated SoP indicator is set.

23. The packet switch of claim 1, further comprising:
a set of output credit registers to track output credits; and
a set of input credit registers to track input credits.

24. The packet switch of claim 1, packets being fixed-size cells, the arbiter resetting input and output lock indicators at each time slot beginning, and decrementing credit for admitted cell transmissions.

25. The packet switch of claim 24, wherein the arbiter further increments borrow counts for admitted cell transmissions.

26. The packet switch of claim 1, further comprising:
"camp on" logic which issues requests in anticipation of completion.

27. The packet switch of claim 1, wherein the switching fabric is a crossbar switch.

28. The packet switch of claim 1, wherein the arbiter uses "unlocked", "available" and "locked" status modes for each input and output.

29. The packet switch of claim 28, wherein an "available" input comprises an input through which a packet is currently transmitting but which has not been scheduled for a next transmission, and wherein any input that initiates a fresh packet transmission transitions into the "available" state, and once matched, transitions to the "locked" state, and remains in the "locked" state until the end of an on-going transmission.

30. The packet switch of claim 28, wherein upon receipt of a start schedule (Ssch) signal at an input, the input transitions into the "available" state, the Ssch signal being issued from a corresponding input module a fixed number of slots prior to an end of its ongoing packet transmission, and the output currently receiving the packet also transitions into the "available" state.

31. A method for high-speed input buffered packet switching, comprising:
providing a switching fabric for connecting input ports to output ports;
for each input port, maintaining an input pointer which references an output port;
for each output port, maintaining an output pointer which references an input port;
in an arbiter,
resetting input credits and output credits associated with input/output pairs taking into account borrows incurred where a packet has been transmitted without credits,
updating the input pointers and output pointers, matching inputs to outputs based on pending requests and available input and output credits; and
in a scheduler, scheduling transmissions through the cross-bar switch according to the matching.

32. The method of claim 31, further comprising, for each input:
resetting input credits associated with the input and an output referenced by the input's input pointer, said input credits being set to a weight value associated with said input/output pair when one or more predefined conditions are true; and
advancing the input pointer.

33. The method of claim 32, wherein the one or more predefined conditions comprise a condition selected from the group consisting of (i) said input/output pair has no input credits, and (ii) there are no pending requests to connect the input/output pair through the packet switch.

34. The method of claim 33, wherein the condition that there are no pending requests is further limited by the condition that the referenced output is available.

35. The method of claim 31, further comprising, for each output:
resetting output credits associated with the output and an input referenced by the output's output pointer, said output credits being set to a weight value associated with said input/output pair when one or more predefined conditions are true; and
advancing the output pointer.

36. The method of claim 35, wherein the one or more predefined conditions comprise a condition selected from the group consisting of (i) said input/output pair has no output credits, and (ii) there are no pending requests to connect the input/output pair through the switch.

37. The method of claim 36, wherein the condition that there are no pending requests is further limited by the condition that the referenced input is available.

38. The method of claim 31, wherein the input pointers and output pointers are round-robin pointers.

39. The method of claim 31, the arbiter further:
selecting input ports for possible matching to output ports; and
binding at least some of the selected input ports to the output ports for which the input ports were selected.

40. The method of claim 39, the steps of selecting and binding being executed serially in plural iterations.

41. The method of claim 39, the steps of selecting and binding being performed upon inputs and outputs having at least one credit.

42. The method of claim 41, the steps of selecting and binding being performed upon inputs and outputs without credits, once no more pairs with credits can be found.

43. The method of claim 31, further comprising:
associating a borrow count with the input/output pair to track borrowed credits when input-output matches are made without credits for the input/output pair.

44. The method of claim 43, further comprising:
maintaining a set of input borrow counters for tracking borrowed input credits; and
maintaining a set of output borrow counters for tracking borrowed output credits, the input borrow counters and output borrow counters operating in conjunction with input and output credit counters.

45. The method of claim 44, further comprising:
dynamically sharing a common bit space between the borrow and credit counters at each output for each inbound stream, and at each input for each outbound stream.

46. The method of claim 45, further comprising:
dynamically locating, with hardware logic, a boundary between credit and borrow fields based on the most significant 1 bit of an associated weights register, during all manipulations involving credit and borrow counters.

47. The method of claim 31, further comprising:
for each unlocked input port, sending a request to every output port for which the input port has a packet/cell awaiting transmission.

48. The method of claim 31, packets being of variable length, the method further comprising:
monitoring, in a connection manager, on-going traffic between inputs and outputs, and updating the input and output credits based on the on-going traffic.

49. The method of claim 48, further comprising:
maintaining across multiple time slots over packet transmissions a set of input and output lock indicators associated with the inputs and outputs that indicate establishment of connections.

50. The method of claim 49, further comprising:
maintaining a set of end-of-packet (EoP) indicators, each EoP indicator for indicating an end of transmission of a packet through an input associated with the EoP indicator, the connection manager resetting lock indicators associated with the input and output through which the packet is being transmitted, thereby releasing ports corresponding to the reset lock indicators for further arbitration.

51. The method of claim 48, the connection manager further:
for each input transmitting a packet, decrementing the input and output credits associated with inputs and outputs through which transmissions are on-going; and
detecting ends of packets.

52. The method of claim 48, further comprising:
associating a start of packet (SoP) indicator with each input port;
setting, by its associated input port, each SoP indicator when a first byte of a packet transmitted from said input port reaches the switching fabric;
monitoring, by the connection manager, the SoP indicators, decrementing of a credit being delayed until the associated SoP indicator is set.

53. The method of claim 31, further comprising:
maintaining a set of output credit registers to track output credits; and
maintaining a set of input credit registers to track input credits.

54. The method of claim 31, packets being fixed-size cells, further comprising:
in the arbiter,
resetting input and output lock indicators at each time slot beginning, and
decrementing number of credits for admitted cell transmissions.

55. The method of claim 54, further comprising:
in the arbiter,
manipulating the borrows.

56. The method of claim 31, further comprising:
issuing requests in anticipation of completion.

57. The method of claim 31, further comprising:
providing "unlocked", "available" and "locked" status modes for each input and output.

58. The method of claim 57, wherein:
an "available" input comprises an input through which a packet is currently transmitting but which has not been scheduled for a next transmission, and wherein any input that initiates a fresh packet transmission transitions into the "available" state, and once matched, transitions to the "locked" state, and remains in the "locked" state until the end of an on-going transmission.

59. The method of claim 57, wherein:
upon receipt of a start schedule (Ssch) signal at an input, the input transitions into the "available" state, the Ssch signal being issued from a corresponding input module a fixed number of slots prior to an end of its ongoing packet transmission, and the output currently receiving the packet also transitions into the "available" state.

60. A method for high-speed input buffered packet switching, comprising:
for each input port:
associating a pointer with said port, the pointer referencing an output port, and
associating, with said port, plural credit counters corresponding to different output ports;
for each output port:
associating a pointer with said port, the pointer referencing an input port, and
associating, with said port, plural credit counters corresponding to different input ports; and
during each time slot:
for each input port not carrying traffic, if the associated credit counter corresponding to the output port referenced by the pointer associated with the input port has zero credits, reloading said credit counter with a specified weight and advancing the pointer,
for each output port not carrying traffic, if the associated credit counter corresponding to the input port referenced by the pointer associated with the output port has zero credits, reloading said credit counter with a specified weight and advancing the pointer,
selecting input-output paths for connection based on pending requests and credit counter values,
for each selected input-output path, decrementing appropriate input port and output port credit counters.

61. The method of claim 60, further comprising, during each time slot:
for each input (output) port not carrying traffic, reloading said credit counter with a specified weight, and advancing the associated pointer, if
i) the associated credit counter corresponding to the output port referenced by the pointer associated with the input port has positive credits,
ii) there are no pending requests between the input port and the output port, and
iii) if the referenced output port is free; and
for each output port not carrying traffic, reloading said credit counter with a specified weight, and advancing the associated pointer, if
i) the associated credit counter corresponding to the input port referenced by the pointer associated with the output port has positive credits,
ii) there are no pending requests between the output port and the input port, and
iii) if the referenced input port is free.

62. A high-speed input buffered packet switch, comprising:
a switching fabric for connecting input ports to output ports;
an arbiter which allocates input credits and output credits to input/output pairs, updates pointers associated with each input and output, and performs arbitration; and
a connection manager which monitors ongoing packet transmissions through the switch, and which performs credit decrements for each input and output involved in an ongoing transmission, the arbiter and connection manager being executed at each of plural time slots.

63. The switch, of claim 62, wherein the arbiter and connection manager execute independently during each time slot.

64. The switch of claim 62, wherein the arbiter performs arbitration by iteratively executing a pre-select phase followed by a bind phase, during the pre-select phase of each iteration, every unlocked output that has received at least one pending request pre-selects one of the requesting inputs, and during the bind phase, each input that has been preselected by at least one output port locks in on one of said output ports.

65. A high-speed input buffered packer switch, comprising:
a switching fabric which connects input ports to output ports;
a processing module associated with each input port and a processing module associated with each output port, each processing module executing independently of the other processing modules,
each output processing module maintaining an output credit count for each input port and, responsive to requests from the input ports and the output credit counts, preselecting one of the requesting input ports according to a fairness algorithm,
each input processing module maintaining an input credit count for each output port and, responsive to the preselections and the input credit counts, binding the input port to one of its preselecting output ports according to a fairness algorithm; and
a scheduler which schedules transmissions through the switching fabric according to the bindings, wherein the credit counts include borrows incurred where a packet has been transmitted without credits.

66. The switch of claim 65, wherein the switching fabric is a crossbar switch.

67. The switch of claim 65,
each output processing module, if it has not been bound to its preselected input, responsive to the requests and the output credit counts, preselecting an unbound requesting input port according to a fairness algorithm, and
each unbound input processing module, responsive to the preselections and the input credit counts, binding the input port to one of its preselecting output ports according to a fairness algorithm.

68. The switch of claim 65, each processing module maintaining credit counts responsive to on-going variable-length packet transmissions through the associated input/output port.

69. The switch of claim 65, multiple switching fabrics operating in parallel.

70. The switch of claim 65, the processing modules executing on separate hardware processors.

71. The switch of claim 65, plural processing modules executing on a common hardware processor.

* * * * *